(12) United States Patent
Oomura et al.

(10) Patent No.: US 8,138,252 B2
(45) Date of Patent: Mar. 20, 2012

(54) THERMALLY DISAPPEARING RESIN PARTICLE

(75) Inventors: Takahiro Oomura, Osaka (JP); Naoyuki Nagatani, Osaka (JP); Miki Inaoka, Osaka (JP); Hiroshi Yamauchi, Yamaguchi (JP)

(73) Assignee: Sekisui Chemical Co., Ltd., Osaka (JP)

( * ) Notice: Subject to any disclaimer, the term of this patent is extended or adjusted under 35 U.S.C. 154(b) by 225 days.

(21) Appl. No.: 11/886,721

(22) PCT Filed: Dec. 13, 2005

(86) PCT No.: PCT/JP2005/022893
§ 371 (c)(1),
(2), (4) Date: Nov. 26, 2007

(87) PCT Pub. No.: WO2006/100806
PCT Pub. Date: Sep. 28, 2006

(65) Prior Publication Data
US 2008/0269394 A1 Oct. 30, 2008

(30) Foreign Application Priority Data

Mar. 23, 2005 (JP) ................................. 2005-085003
Jun. 1, 2005 (JP) ................................. 2005-161738
Jul. 20, 2005 (JP) ................................. 2005-210237

(51) Int. Cl.
C08K 3/00 (2006.01)
C08K 3/26 (2006.01)
B32B 18/00 (2006.01)
B32B 5/16 (2006.01)

(52) U.S. Cl. ........ 524/424; 524/612; 524/430; 524/428; 106/31.14; 428/402; 428/402.24; 523/200; 523/217

(58) Field of Classification Search ................. 524/424; 106/31.14; 428/402, 402.24; 427/213.3, 427/231.36; 523/200, 217
See application file for complete search history.

(56) References Cited

U.S. PATENT DOCUMENTS

| | | | |
|---|---|---|---|
| 4,898,902 A | 2/1990 | Nagai et al. | |
| 5,419,857 A | 5/1995 | Van den Sype | |
| 7,591,921 B2 * | 9/2009 | Fukui et al. | 156/344 |
| 2003/0220424 A1 | 11/2003 | Schofalvi et al. | |
| 2004/0091709 A1 | 5/2004 | Ohmura et al. | |
| 2005/0276934 A1 | 12/2005 | Fukui et al. | |

FOREIGN PATENT DOCUMENTS

| | | |
|---|---|---|
| JP | 60-122770 | 7/1985 |
| JP | 60-155567 | 8/1985 |
| JP | 4-110007 | 4/1992 |
| JP | 5-9232 | 1/1993 |
| JP | 6-41241 | 2/1994 |
| JP | 7-291739 | 11/1995 |
| JP | 9-175869 | 7/1997 |
| JP | 2003-10617 | 1/2003 |
| JP | 2003-010617 | 1/2003 |
| JP | 2003-095750 | 4/2003 |
| JP | 2003-104778 | 4/2003 |
| JP | 2003-183087 | 7/2003 |
| JP | 2004-269308 | 9/2004 |
| JP | 2004-315719 | 11/2004 |
| WO | 02/072671 | 9/2002 |
| WO | 2004/050762 | 6/2004 |

OTHER PUBLICATIONS

Chinese Language Office Action with English translation thereof for counterpart CN 200580049223.6 received on Jul. 7, 2009.
Extended European Search Report dated Apr. 26, 2010 in European Application No. 05816501.0.

* cited by examiner

Primary Examiner — James J Seidleck
Assistant Examiner — Deve E Valdez
(74) Attorney, Agent, or Firm — Wenderoth, Lind & Ponack, L.L.P.

(57) ABSTRACT

It is an object of the present invention to provide a thermally disappearing resin particle and a thermally disappearing hollow resin particle which can be decomposed at a low temperature in a short time and do not cause deformation or cracking of a sintered body to be obtained in the case of using as a binder for a ceramic or a lightening material; a method of producing the thermally disappearing hollow resin particle; a ceramic composition which can be degreased and fired at a low temperature in a short time and gives a molded body with a high porosity without deformation or cracking even in the case a large quantity of a pore-forming material is used; and a method of producing a porous ceramic filter.

The present invention is directed to a thermally disappearing resin particle, which contains a polyoxyalkylene resin, and 10% by weight or more of the whole particle disappearing within an hour by heating at a prescribed temperature in a range from 100 to 300° C.

14 Claims, No Drawings

THERMALLY DISAPPEARING RESIN PARTICLE

This application is a U.S. national stage of International Application No. PCT/JP2005/022893 filed Dec. 13, 2005.

TECHNICAL FIELD

The present invention relates to a thermally disappearing resin particle and a thermally disappearing hollow resin particle which can be decomposed at a low temperature in a short time and do not cause deformation or cracking of a sintered body to be obtained in the case of using as a binder for a ceramic or a lightening material; a method of producing the thermally disappearing hollow resin particle; a ceramic composition which can be degreased and fired at a low temperature in a short time and gives a molded body with a high porosity without deformation or cracking even in the case a large quantity of a pore-forming material is used; and a method of producing a porous ceramic filter.

BACKGROUND ART

Thermoplastic polymers represented by organic polymers, particularly polyacrylic acid esters, polystyrene, polyethylene and the like are decomposed by heating and thus have heat decomposability and at the same time relatively high softening temperature and excellent for formability. Accordingly, the organic polymers have been used widely as binders for forming ceramics, thermal recording resins, thermally collapsing adhesives and the like on the basis of such heat decomposability and formability. On the other hand, recently, organic polymers in form of resin particles with micron sizes have been mixed with ceramics and fired to produce lightweight earthenware, glass filters and the like.

In such a manner, in the case resin particles of an organic polymer are used as a binder for ceramics or a lightening material, it is needed to remove the resin component by thermally decomposing or burning the resin particles by firing under the non-oxygen condition or the oxygen ambient.

However, in the firing process, the temperature at which the resin component is completely removed is close to the fusion temperature of ceramic raw material powder, glass powder or the like, residues such as carbon derived from resin particles have sometimes been left in the inside of a sintered body. Further, in the case the temperature at which the resin component is completely removed is higher than the fusion temperature, the sintered body has sometimes been deformed. Moreover, due to the combustion heat at the time of burning the resin component, deformation or cracking of a sintered body to be obtained has sometimes occurred. Accordingly, it has been desired to obtain resin particles whose resin component can be removed at a low temperature in the firing step and which scarcely causes strain by combustion heat and scarcely leave residues such as carbon derived from the resin component in the sintered body after firing.

To deal with such a problem, for example, Patent Document No. 1 discloses a thermally decomposable styrene type copolymer containing a styrene monomer and an α-methyl styrene monomer at a prescribed ratio as a resin material easy to be decomposed even at a low temperature and excellent in the molding processibility.

However, even such a thermally decomposable styrene type copolymer is still insufficient in the thermal decomposability at a low temperature and if it is tried to produce lighter earthenware using a large quantity of a resin, it is required to carry out the firing step at a high temperature not lower than 300° C. for a long time and therefore it takes a long time for the entire production step to result in a problem of lowering a production efficiency. Further, due to increase of combustion heat of the resin, a considerable strain is applied to a ceramic sintered body to be obtained and it results in a problem of occurrence of deformation and cracking. Accordingly, in the firing step, resin particles which can be decomposed thermally at a low temperature in a short time have been urgently required.

In recent years, a porous honeycomb filter wherein a partition wall of a honeycomb structure body obtained by sintering ceramic powder such as silicon carbide (SiC) or a cordierite powder was changed into the porous structure has been proposed. Such a porous ceramic filter (a porous honeycomb filter) is capable of removing various kinds of impurities contained in a fluid such as a gas by passing the fluid through the porous partitioning walls. The porous ceramic filter has been practically employed for such as a filter for trapping particulate of exhaust gas emitted from a diesel engine vehicle (a diesel particulate filter).

With respect to such a porous ceramic filter, the average fine pore diameter and porosity of the porous partitioning walls are very important factors for determining the functional property of the filter and in the case, for example, a diesel particulate filter or the like, a filter having a proper average fine pore diameter and high porosity has been required in accordance with the correlation among the particulate trapping efficiency, pressure loss, and trapping time.

Conventionally, as a method of controlling the average fine pore diameter and porosity of a porous ceramic material has been known a method of adding the pore-forming material such as graphite to a ceramic composition and degreasing and firing the obtained ceramic composition at a high temperature. However, this method requires use of a large quantity of a pore-forming material to obtain high porosity and in this case, the time of degreasing and firing carried out at 250° C. or higher is prolonged and thus the production step takes a long time and at the same time, considerably high strain is applied to the ceramic molded body due to increase of the combustion heat of the pore-forming material to result in a problem of occurrence of cracking in the molded body.

On the other hand, Patent Document No. 2 discloses a method of decreasing a combustion component by making the pore-forming material hollow to lower the combustion heat generation of the pore-forming material. According to the method, the combustion heat generation of the pore-forming material in the degreasing and firing step can be decreased and occurrence of cracking in the molded body can be lessened.

However, since combustion heat generation at 250° C. or higher still remains even in this method, in the case a porous ceramic material with a high porosity is to be produced by adding a large quantity of the pore-forming material, the problem of occurrence of cracking in the molded body is not solved yet.

Patent Document No. 1: Japanese Kokai Publication Hei-6-41241

Patent Document No. 2: Japanese Kokai Publication 2003-10617

DISCLOSURE OF THE INVENTION

Problems Which the Invention is to Solve

In view of the above-mentioned state of the art, the present invention aims to provide a thermally disappearing resin particle and a thermally disappearing hollow resin particle which can be decomposed at a low temperature in a short time and do not cause deformation or cracking of a sintered body to be obtained in the case of using as a binder for a ceramic or a lightening material; a method of producing the thermally disappearing hollow resin particle; a ceramic composition which can be degreased and fired at a low temperature in a short time and gives a molded body with a high porosity without deformation or cracking even in the case a large quantity of a pore-forming material is used; and a method of producing a porous ceramic filter.

Means for Solving the Object

A thermally disappearing resin particle of the present invention 1 is that which contains a polyoxyalkylene resin, and 10% by weight or more of the whole particle disappearing within an hour by heating at a prescribed temperature in a range from 100 to 300° C.

A thermally disappearing resin particle of the present invention 2 is that which contains 30% by weight or more of a polyoxyalkylene resin, and 40% by weight or more of the whole particle disappearing within an hour by heating at a prescribed temperature in a range from 140 to 300° C.

A thermally disappearing resin particle of the present invention 3 is that which contains a polyoxyalkylene resin and a decomposition-promoting agent, 10% by weight or more of the thermally disappearing resin particle disappearing within an hour by heating at a prescribed temperature in a range from 100 to 250° C., and 50% by weight loss temperature being 210° C. or lower.

A thermally disappearing hollow resin particle of the present invention is that which has 5 to 95% hollow ratio at 23° C., and 10% by weight or more of the thermally disappearing hollow resin particle disappearing within an hour by heating at a prescribed temperature in a range from 100 to 300° C.

A method of producing thermally disappearing hollow resin particle of the present invention 1 is that which comprises the step of carrying out suspension polymerization, emulsion polymerization, dispersion polymerization, soap-free polymerization, or mini-emulsion polymerization of a solution containing a polyoxyalkylene macromonomer or a monomer mixture containing a polyoxyalkylene macromonomer and another polymerizable monomer in combination with a hollowing agent.

A method of producing a thermally disappearing hollow resin particle of the present invention 2 is that which comprises the step of carrying out suspension polymerization of a solution containing a polyoxyalkylene macromonomer or a monomer mixture containing a polyoxyalkylene macromonomer and another polymerizable monomer in combination with a hollowing agent.

A method of producing a thermally disappearing hollow resin particle of the present invention 3 is that which comprises the step of producing an emulsion containing a water-containing a hollowing agent enclosed in a polyoxyalkylene macromonomer or a monomer mixture containing a polyoxyalkylene macromonomer and another polymerizable monomer; the step of dispersing the emulsion in water; and the step of polymerizing the polyoxyalkylene macromonomer or the monomer mixture.

A ceramic composition of the present invention 1 is that which comprises a thermally disappearing resin particle containing a polyoxyalkylene resin and a ceramic powder, and 10% by weight or more of the thermally disappearing resin particle disappearing within an hour by heating at a prescribed temperature in a range from 100 to 250° C.

A ceramic composition of the present invention 2 is that which comprises a thermally disappearing hollow resin particle and a ceramic powder, and the thermally disappearing hollow resin particle having a hollow ratio at 23° C. of 5 to 95% by weight, and 10% by weight or more of the thermally disappearing hollow resin particle disappearing within an hour by heating at a prescribed temperature in a range from 100 to 300° C.

Hereinafter, the present invention will be described in detail.

The thermally disappearing resin particle of the present invention 1 is that which contains a polyoxyalkylene resin, and 10% by weight or more of the whole particle disappearing within an hour by heating at a prescribed temperature in a range from 100 to 300° C.

In accordance with findings of investigations, inventors of the present invention have found that if a thermally disappearing resin particle, which contains a polyoxyalkylene resin, and wherein a portion of the thermally disappearing resin particle disappears by heating at a prescribed temperature in a range from 100 to 300° C., is used as a binder for ceramics or a lightening material, they can improve the production efficiency by shortening the time to be taken for firing step while providing good handling easiness and making the molding property excellent at a normal temperature and suppressing deformation, which is attributed to the combustion heat, of a ceramic molded product during the firing.

The above-mentioned polyoxyalkylene resin can be decomposed to hydrocarbons, ethers and the like with low molecular weights and successively disappears due to phase alteration such as combustion reaction or evaporation by heating at a prescribed temperature in a range from 100 to 300° C.

With respect to the thermally disappearing resin particle of the present invention 1, 10% by weight or more of the thermally disappearing resin particle disappear within an hour by heating at a prescribed temperature in a range from 100 to 300° C. If the time to be taken for disappearance exceeds an hour, the production efficiency is decreased. Further, if the disappearing portion is less than 10% by weight, the heat generation amount is decreased and it results in insufficiency of the effect for suppressing deformation. It is preferable for the thermally disappearing resin particle that 40% by weight or more of the thermally disappearing resin particle disappear within an hour by heating at a prescribed temperature in a range from 100 to 300° C.

The decomposition starting temperature of the thermally disappearing resin particle of the present invention 1 is preferably 110° C. in the lower limit and 250° C. in the upper limit. If it is lower than 110° C., decomposition is started before the firing step is carried out to lower the properties of a product to be obtained and if it exceeds 250° C., 10% by weight or more of the thermally disappearing resin particle may not disappear within an hour.

In this description, the decomposition starting temperature means a temperature at which the weight decrease ratio by heating reaches 5% or higher and can be measured by thermogravimetric analysis (TGA) using DSC-6200 (manufactured by Seiko Instruments Inc.).

In the case the thermally disappearing resin particle of the present invention 1 is heated at a heating rate of 5° C./min, the 50% by weight loss temperature is preferably 130° C. in the lower limit and 280° C. in the upper limit. If it is lower than 130° C., thermal decomposition proceeds excessively before the firing step and the properties of the product to be obtained may be lowered and if it exceeds 280° C., residues such as carbon derived from the resin component may remain in the sintered body after firing.

Commercialized products of the above-mentioned polyoxyalkylene resin are, for example, MS Polymer S-203, S-303, and S-903 (all manufactured by Kaneka Corporation); Silyl SAT-200, MA-403, and MA-447 (all manufactured by Kaneka Corporation); Epion EP103S, EP303S, and EP505S (all manufactured by Kaneka Corporation); and Excestar ESS-2410, ESS-2420, and ESS-3630 (all manufactured by Asahi Glass Co., Ltd.).

The thermally disappearing resin particle of the present invention 1 is preferable to contain a crosslinking component and has a 10% compressive strength at 23° C. of 1 to 1000 MPa. In the case no crosslinking component is contained, the 10% compressive strength may become lower than 1 MPa and the particle may be broken at the time of molding at a normal temperature to worsen the handling property. Further, even if the breakage is avoided owing to the flexibility of the particle, the particle is sometimes deformed to make it impossible to cause a prescribed pore-forming effect in some cases. The 10% compressive strength of the resin particle is generally preferable to be 1000 MPa or lower.

The polyoxyalkylene resin to be contained in the thermally disappearing resin particle of the present invention 1 is preferably at least one of polymer selected from polyoxypropylene, polyoxyethylene and polyoxytetramethylene in order to decompose the resin particle at a prescribed temperature in a range from 100 to 300° C. and keep the 10% compressive strength at 23° C. of 1 to 1000 MPa. If a polyoxyalkylene resin other than the above-exemplified polymers is used, it may become impossible to obtain the prescribed decomposition temperature or the particle strength. To obtain the proper decomposition temperature and particle strength, the content of polyoxypropylene in the above-mentioned polyoxyalkylene resin is more preferably 50% by weight or higher.

The number average molecular weight of the polyoxyalkylene resin to be contained in the thermally disappearing resin particle of the present invention 1 is preferably 300 to 1000000. If the molecular weight is lower than 300, it becomes difficult to keep the 10% compressive strength at 23° C. of 1 to 1000 MPa and on the contrary, if it exceeds 1000000, it becomes difficult to cause the effect of disappearing the resin particle by heating at a prescribed temperature in a range from 100 to 300° C.

By addition of a decomposition-promoting agent to the thermally disappearing resin particle of the present invention 1, the thermally disappearing resin-particle disappears at a low temperature within a short time. Non-limiting examples of the types of the above-mentioned decomposition-promoting agent may be peroxides such as benzoyl peroxide and lauroyl peroxide; azo compounds such as 2,2'-azobisisobutyronitrile, 2-carbamoylazoformamide, and 1,1'-azobiscyclohexane-1-carbonitrile; and the like.

The average particle diameter of the thermally disappearing resin particle of the present invention 1 is preferably 0.01 to 500 μm. The inventors have found that decomposition of the thermally disappearing resin particle of the present invention 1 is promoted in the presence of oxygen such as air using oxygen as a catalyst. Further, the inventors have found that since the surface area of the particle is considerably increased if the average particle diameter is 500 μm or smaller, such decomposition using oxygen as a catalyst is accelerated. Accordingly, the average particle diameter is adjusted to be preferably 500 μm or smaller and more preferably 200 μm or smaller. If the average particle diameter is smaller than 0.01 μm or larger than 500 μm, it becomes difficult to obtain the particle by polymerization at a high yield.

The thermally disappearing resin particle of the present invention 2 is that which contains 30 to 100% by weight of a polyoxyalkylene resin, and 40% by weight or more of the whole particle disappearing within an hour by heating at a prescribed temperature in a range from 140 to 300° C.

The thermally disappearing resin particle of the present invention 2 contains 30 to 100% by weight of a polyoxyalkylene resin. If the content of the polyoxyalkylene resin is less than 30% by weight, the thermal disappearing property sometimes becomes insufficient. By addition of the prescribed amount or more amount of the polyoxyalkylene resin in the thermally disappearing resin particle of the present invention 2, 40% by weight or more of the whole particle disappear within an hour by heating at a prescribed temperature in a range from 140 to 300° C.

Other constitutions of the thermally disappearing resin particle of the present invention 2 are same as the thermally disappearing resin particle of the present invention 1 and therefore, the detailed descriptions will be omitted.

Non-limiting methods of producing the thermally disappearing resin particles of the present invention 1 or 2 may be conventionally known polymerization methods of producing resin particles using a vinyl monomer in the presence of polyoxyalkylene resin, such as suspension polymerization, emulsion polymerization, dispersion polymerization, soap-free polymerization, or mini-emulsion polymerization.

Further, the polyoxyalkylene resin may be coated by such as organic resin and encapsulated. Non-limiting methods of encapsulating may be a core-shellvation method, a drying-in-liquid method, an interface polymerization method, and an in-situ polymerization method.

As a method of producing the thermally disappearing resin particles of the present invention 1 or 2 is preferably a method of polymerizing a polyoxyalkylene macromonomer having a functional group alone or in combination with another polymerizable monomer in a solvent. Further, the number average molecular weight of the polyoxyalkylene unit contained in the above-mentioned macromonomer is preferably 30.0 to 1000000. If it is lower than 300, it becomes difficult to keep the 10% compressive strength at 23° C. of 1 to 1000 MPa and on the contrary, if it exceeds 1000000, it becomes difficult to cause the effect of disappearing the resin particle by heating at a prescribed temperature.

In this description, the macromonomer means a high molecular weight linear molecule having a polymerizable functional group such as vinyl group at the molecular terminal and a polyoxyalkylene macromonomer means a macromonomer of which the linear portion comprises polyoxyalkylene.

Non-limiting functional groups contained in the above-mentioned polyoxyalkylene macromonomer may include polymerizable unsaturated hydrocarbons such as (meth)acrylate; isocyanate groups, epoxy groups, hydrolyzable, silyl groups, hydroxy groups, carboxyl groups, and the like, and it is preferable to use a polyoxyalkylene macromonomer having a radical polymerizable unsaturated hydrocarbon in terms of the easiness of production of the thermally disappearing resin particle. A polyoxyalkylene macromonomer having a (meth)acryloyl group with high polymerization reactivity is more preferable.

The number of functional groups to be contained in the polyoxyalkylene macromonomer is not particularly limited, however macromonomers having two or more functional groups are preferably used since they work as a crosslinking component to improve the particle strength.

Examples of the above-mentioned polyoxyalkylene macromonomer may practically include polyoxyethylene di(meth)acrylate (Blemmer PDE-50, PDE-100, PDE-200, PDE-400, PDE-600, ADE-200, and ADE-400; manufactured by NOF CORPORATION); polyoxypropylene di(meth)acrylate (Blemmer PDP-400, PDP-700, PDP-1000, and ADP-400; manufactured by NOF CORPORATION); polyoxypropylene (meth)acrylate (PP-500, PP-800, AP-400, and AP-800; manufactured by NOF CORPORATION); polyoxytetramethylene di(meth)acrylate (Blemmer PDT-650 and ADT-250; manufactured by NOF CORPORATION); polyoxyethylene-polyoxytetramethylene methacrylate (Blemmer 55PET-800; manufactured by NOF CORPORATION); and the like.

Another polymerizable monomer to be used in combination of the above-mentioned polyoxyalkylene macromonomer is not particularly limited, however use of a radical polymerizable monomer is preferable in terms of the easiness of production of the thermally disappearing resin particle. Examples of the radical polymerizable monomer are (meth)acrylate, (meth)acrylonitrile, (meth)acrylic acid, styrene and its derivatives, vinyl acetate and the like.

Further, another polymerizable monomer to be used in combination of the above-mentioned polyoxyalkylene macromonomer may be a polyfunctional monomer to improve the particle strength. Non-limiting polyfunctional monomers may include acrylic type polyfunctional monomers such as trimethylolpropane tri(meth)acrylate, and the like. An additional example of the polyfunctional monomer is divinylbenzene.

The thermally disappearing resin particle of the present invention 3 is that which contains a polyoxyalkylene resin and a decomposition-promoting agent, and 10% by weight or more of the thermally disappearing resin particle disappearing within an hour by heating at a prescribed temperature in a range from 100 to 250° C., and 50% by weight loss temperature being 210° C. or lower.

In accordance with results of investigations, the inventors of the present invention have found that addition of a polyoxyalkylene resin and a decomposition-promoting agent to the thermally disappearing resin particle makes it possible to make the thermally disappearing resin particle so excellent in decomposability in a low temperature region as to disappear in a prescribed ratio within an hour by heating at a prescribed temperature in a range from 100 to 250° C. and to have the 50% by weight loss temperature at 210° C. or lower. Further, the inventors have found that if the thermally disappearing resin particle excellent in the low temperature decomposability are used as a binder for ceramics, a lightening material, or the like, they can improve the production efficiency by shortening the time to be taken for firing step while providing good handling easiness and making the molding property excellent at a normal temperature and suppressing deformation or cracking, which is attributed to the combustion heat, of a ceramic molded product during the firing step. These findings have led to completion of the thermally disappearing resin particle of the present invention 3.

The thermally disappearing resin particle of the present invention 3 contains a polyoxyalkylene resin.

The above-mentioned polyoxyalkylene resin is decomposed to hydrocarbons, ethers and the like with low molecular weights and successively disappears due to phase alteration such as combustion reaction and evaporation, and exhibited the thermally disappearing property by heating at a prescribed temperature in a range from 100 to 250° C.

Non-limiting examples of the above-mentioned polyoxyalkylene resin may be preferably at least one kind of polymer selected from the group consisting of polyoxypropylene, polyoxyethylene and polyoxytetramethylene. If a polyoxyalkylene resin other than the above-exemplified polymers is used, it may become impossible to obtain the prescribed thermal disappearing property or the particle strength. Polyoxypropylene is more preferable among them. To obtain the proper thermal disappearing property and particle strength, 50% by weight or higher of the above-mentioned polyoxyalkylene resin contained in the thermally disappearing resin particle is preferably polyoxypropylene.

Commercialized products of the above-mentioned polyoxyalkylene resin are, for example, MS Polymer S-203, S-303, and S-903 (all manufactured by Kaneka Corporation); Silyl SAT-200, MA-403, and MA-447 (all manufactured by Kaneka Corporation); Epion EP103S, EP303S, and EP505S (all manufactured by Kaneka Corporation); PEG 200, PEG 300, PEG 400, PEG 600, and PEG 1000 (all manufactured by NOF CORPORATION); UNIOL D-250, D-400, D-700, and D-1000 (all manufactured by NOF Corporation); Excestar ESS-2410, ESS-2420, and ESS-3630 (all manufactured by Asahi Glass Co., Ltd.).

The molecular weight of the above-mentioned polyoxyalkylene resin is not particularly limited and the number average molecular weight is preferably 300 in the lower limit and 1000000 in the upper limit. If the molecular weight is lower than 300, it becomes difficult to keep the 10% compressive strength at 23° C. of 1 to 1000 MPa and on the contrary, if it exceeds 1000000, it becomes difficult to cause the effect that the thermally disappearing resin particle disappears by heating at a prescribed temperature in a range from 100 to 250° C.

The content of the above-mentioned polyoxyalkylene resin in the thermally disappearing resin particle of the present invention 3 is preferably 5% by weight in the lower limit. If it is lower than 5% by weight, the thermal disappearing property of the obtained thermally disappearing resin particle may become insufficient.

The thermally disappearing resin particle of the present invention 3 contains the decomposition-promoting agent.

In this description, the decomposition-promoting agent means a substance which generates radical at a prescribed temperature and promotes decomposition reaction including depolymerization of a polymer induced by the radical.

By addition of the above-mentioned decomposition-promoting agent, the decomposition of the above-mentioned polyoxyalkylene resin accelerates and the thermally disappearing resin particle disappears at a low temperature in a short time.

Non-limiting examples of the above-mentioned decomposition-promoting agent are azo compounds, organic peroxides and the like.

The above-mentioned decomposition-promoting agent is preferably a decomposition-promoting agent having a 1 h half-life temperature of 100 to 170° C. and/or a decomposition-promoting agent having a 1 h half-life temperature of 170 to 250° C. In the thermally disappearing resin particle of the present invention 3, the decomposition-promoting agent having a 1 h half-life temperature of 100 to 170° C. and the decomposition-promoting agent having a 1 h half-life temperature of 170 to 250° C. may be used independently alone or in combination.

In the case the decomposition-promoting agent having a 1 h half-life temperature of 100 to 170° C. is to be used, since the thermally disappearing resin particle can be quickly decomposed in a low temperature range in the initial period of the ceramic firing step, the agent is preferably used for shortening firing step and improving the production efficiency. In the case the decomposition-promoting agent having a 1 h half-life temperature of 170 to 250° C. is to be used, since the decomposition is promoted in a high temperature range, the agent is preferably used for promoting decomposition in the latter period of the ceramic firing step. Further, in the case the decomposition-promoting agent having a 1 h half-life temperature of 100 to 170° C. and the decomposition-promoting agent having a 1 h half-life temperature of 170 to 250° C. are to be used in combination, since abrupt decomposition heat generation during the initial period of the firing step can be suppressed, they are preferably used for promoting the decomposition evenly during the latter period of the firing step and shortening the firing step.

In this description, the 1 h half-life temperature is a temperature at which the concentration of the decomposition-promoting agent is decreased to a half of the initial concentration after a solution having the initial concentration of 0.05 to 0.1 mol/l of the decomposition-promoting agent is prepared by using an inactive solution such as benzene for the decomposition-promoting agent and the solution is carried out thermal decomposition for 1 hour in a glass container purged with nitrogen.

The above-mentioned decomposition-promoting agent is preferably an azo compound or an organic peroxide.

Examples of the azo compound are 1,1-azobis(cyclohexane-1-carbonitrile) (106° C.), 1-[(1-cyano-1-methylethyl)azo]formamide (123° C.), 2,2-azobis[N-(2-propenyl)-2-methylpropionamide] (117° C.), 2,2-azobis(N-butyl-2-methylpropionamide) (132° C.), 2,2-azobis(N-cyclohexyl-2-methylpropionamide) (134° C.) and the like. The temperature in the parenthesis shows the 1 h half-life temperature.

Examples to be used as the decomposition-promoting agent which shows an excellent decomposing property among these azo compounds are 1,1-azobis(cyclohexane-1-carbonitrile) (V-40, manufactured by Wako Pure Chemical Industries, Ltd.), 2,2-azobis(N-cyclohexyl-2-methylpropionamide) (Vam-111, manufactured by Wako Pure Chemical Industries, Ltd.) and the like.

Examples of the above-mentioned organic peroxide having the 1 h half-life temperature in a range from 100 to 170° C. are 1,1-bis(tert-hexylperoxy)-3,3,5-trimethylcyclohexane (106° C.), 1,1-bis(tert-butylperoxy)cyclohexane (111° C.), tert-butyl peroxy-3,5,5-trimethylhexanoate (119° C.), tert-butyl peroxyacetate (121° C.), n-butyl 4,4-bis(tert-butylperoxy)valerate (126° C.), tert-butyl cumyl peroxide (137° C.), 2,5-dimethyl-2,5-di(tert-butylperoxy)hexine-3 (150° C.), p-menthane hydroperoxide (151° C.) and the like. And examples of the above-mentioned organic peroxide having the 1 h half-life temperature in a range from 170 to 250° C. are diisopropylbenzene hydroperoxide (173° C.), 1,1,3,3-tetramethylbutyl hydroperoxide (182° C.), cumene hydroperoxide (188° C.), tert-butyl hydroperoxide (196° C.) and the like. The temperature in the parenthesis shows the 1 h half-life temperature.

Those which particularly show an excellent decomposing property and are preferably used among the above-mentioned organic peroxides are tert-butyl peroxy-3,5,5-trimethylhexanoate (Perbutyl 355, manufactured by NOF CORPORATION), n-butyl 4,4-bis(tert-butylperoxy)valerate (Perhexa V, manufactured by NOF CORPORATION), tert-butyl cumyl peroxide (Perbutyl C, manufactured by NOF CORPORATION), 2,5-dimethyl-2,5-di(tert-butylperoxy)hexine-3 (Perhexine 25B, manufactured by NOF CORPORATION), p-menthane hydroperoxide (Permenthane H, manufactured by NOF CORPORATION), diisopropylbenzene hydroperoxide (Percumyl P, manufactured by NOF CORPORATION), and 1,1,3,3-tetramethybutyl hydroperoxide (Perocta H, manufactured by NOF CORPORATION).

In the thermally disappearing resin particle of the present invention 3, the content of the above-mentioned decomposition-promoting agent is preferably 0.1% by weight in the lower limit and 10% by weight in the upper limit. If it is out of the range, the effect of promoting the decomposition of the thermally disappearing resin particle cannot be sufficiently exhibited.

With respect to the thermally disappearing resin particle of the present invention 3, 10% by weight or more of the thermally disappearing resin particle disappear within an hour by heating at a prescribed temperature in a range from 100 to 250° C.

By containing the above-mentioned decomposition-promoting agent, the thermally disappearing resin particle of the present invention 3 is promoted in decomposition by heating and thus show extremely excellent decomposability even in a temperature range as low as 100 to 250° C., and 10% by weight or more of the thermally disappearing resin particle disappear. If the time to be taken for the disappearance exceeds an hour, the production efficiency is decreased and if the disappearing portion of the resin particle is less than 10% by weight, the effect of decreasing the heat generation amount and suppressing deformation may become insufficient. It is preferable for the thermally disappearing resin particle of the present invention 3 that 10% by weight or more of the thermally disappearing resin particle disappear by heating at a prescribed temperature in a range from 120 to 200° C.

The 50% by weight loss temperature of the thermally disappearing resin particle of the present invention 3 is 210° C. or lower.

Since the thermally disappearing resin particle of the present invention 3 contains the above-mentioned decomposition-promoting agent, decomposition of the thermally disappearing resin particle is promoted and the thermally disappearing resin particle is provided with extremely excellent decomposability and the 50% by weight loss temperature becomes 210° C. or lower. If the 50% by weight loss temperature exceeds 210° C., it takes a long time for production step to result in decrease of the production efficiency or residues such as carbon derived from resin component are sometimes left in a sintered body after firing. The thermally disappearing resin particle of the present invention 3 is preferable to have the 50% by weight loss temperature of 180° C. or lower.

The decomposition starting temperature of the thermally disappearing resin particle of the present invention 3 is preferably 110° C. in the lower limit and 200° C. in the upper limit. If it is lower than 110° C., decomposition is started before the firing step is carried out to lower the properties of a product to be obtained and if it exceeds 200° C., 10% by weight or more of the thermally disappearing resin particle may not disappear within an hour.

In this description, the decomposition starting temperature means a temperature at which the weight decrease ratio by heating reaches 5% or higher and can be measured by thermogravimetric analysis (TGA) using such as DSC-6200' (manufactured by Seiko Instruments Inc.).

The average particle diameter of the thermally disappearing resin particle of the present invention 3 is preferably 0.01 to 500 μm. The inventors have found that decomposition of the thermally disappearing resin particle of the present invention 3 is promoted in the presence of oxygen such as air using oxygen as a catalyst. Further, the inventors have found that since the surface area of the particle is considerably increased if the average particle diameter is 500 μm or smaller, such decomposition using oxygen as a catalyst is accelerated.

Accordingly, the average particle diameter is adjusted to be preferably 500 µm or smaller and more preferably 200 µm or smaller. If the average particle diameter is smaller than 0.01 µm or larger than 500 µm, it becomes difficult to obtain the particle by polymerization at a high yield.

Non-limiting method of producing the thermally disappearing resin particle of the present invention 3 may be conventionally known polymerization methods of producing resin particles such as suspension polymerization, emulsion polymerization, dispersion polymerization, soap-free polymerization, mini-emulsion polymerization or the like, using a solution containing a polyoxyalkylene macromonomer or a monomer mixture containing the polyoxyalkylene macromonomer and another polymerizable monomer in combination with the decomposition-promoting agent. The suspension polymerization method is preferable among them.

With respect to the polyoxyalkylene macromonomer; the monomer mixture containing the polyoxyalkylene macromonomer and another polymerizable monomer; and the like, those which are used in the method of producing the thermally disappearing resin particle of the present invention 1 or 2 may be used.

In the method of producing the thermally disappearing resin particle of the present invention 3, the particle containing the polyoxyalkylene resin and the decomposition-promoting agent may be coated by such as organic resin and encapsulated. Non-limiting methods of encapsulating may be a core-shellvation method, a drying-in-liquid method, an interface polymerization method, an in-situ polymerization method, and the like.

The thermally disappearing hollow resin particle of the present invention is that which has 5 to 95% hollow ratio at 23° C., and 10% by weight or more of the thermally disappearing hollow resin particle disappearing within an hour by heating at a prescribed temperature in a range from 100 to 300° C.

In accordance with results of investigations, the inventors have found that if the thermally disappearing resin particle which has a hollow ratio at 23° C. and a disappearing amount within an hour by heating at a prescribed temperature from 100 to 300° C. in respectively prescribed ranges is used as a binder for ceramics, a lightening material, or the like, they can improve the production efficiency by shortening the time to be taken for firing step while providing good handling easiness and making the molding property excellent at a normal temperature and suppressing deformation or cracking, which is attributed to the combustion heat, of a ceramic molded product during the firing step. These findings have led to completion of the thermally disappearing hollow resin particle of the present invention.

The hollow ratio at 23° C. of the thermally disappearing hollow resin particle of the present invention is 5% in the lower limit and 95% in the upper limit. If it is lower than 5%, the effect of decreasing the combustion heat generation becomes insufficient and deformation and cracking may occur in a molded ceramic product. If it exceeds 95%, the particle strength of the thermally disappearing hollow resin particle is lowered and in the case the particle is used as a binder or a lightening material, the particle shape cannot be retained. The hollow ratio is preferably 30% in the lower limit and 95% in the upper limit and more preferably 50% in the lower limit.

In this description, the hollow ratio means the ratio of the volume of the hollow part in the entire volume of the thermally disappearing hollow resin particle and may be measured using, for example, Porosimeter 2000 (manufactured by AMCO Co., Ltd.) or the like.

The thermally disappearing hollow resin particle of the present invention is that wherein 10% by weight or more of the thermally disappearing hollow resin particle disappear within an hour by heating at a prescribed temperature in a range from 100 to 300° C. If the time to be taken for disappearing exceeds an hour, the production efficiency is decreased. If the disappearing portion of the resin particle is less than 10% by weight, the effect of decreasing the heat generation amount and suppressing deformation may become insufficient. It is preferable for the thermally disappearing hollow resin particle that 40% by weight or more of the thermally disappearing hollow resin particle disappear within an hour by heating at a prescribed temperature in a range from 100 to 300° C.

The decomposition starting temperature of the thermally disappearing hollow resin particle of the present invention is preferably 110° C. in the lower limit and 250° C. in the upper limit. If it is lower than 110° C., decomposition is started before the firing step is carried out to lower the properties of a product to be obtained and if it exceeds 250° C., 10% by weight or more of the thermally disappearing hollow resin particle may not disappear within an hour.

In this description, the decomposition starting temperature means a temperature at which the weight decrease ratio by heating reaches 5% or higher and can be measured-by thermogravimetric analysis (TGA) using DSC-6200 (manufactured by Seiko Instruments Inc.) or the like.

The 50% by weight loss temperature in the case the thermally disappearing hollow resin particle of the present invention is heated at a heating rate of 5° C./min is preferably 130° C. in the lower limit and 280° C. in the upper limit. If it is lower than 130° C., thermal decomposition is promoted exceedingly before the firing step is carried out to lower the properties of a product to be obtained and if it exceeds 280° C., residues such as carbon derived from the resin component may sometimes be left in a sintered body after firing.

The heat generation amount from start of the decomposition to completion of the composition in the case of heating the thermally disappearing hollow resin particle of the present invention is preferably 5000 cal/ml in the upper limit. If it exceeds 5000 cal/ml, a significant strain is applied to a sintered body to be obtained and deformation and cracking may be caused.

The thermally disappearing hollow resin particle of the present invention is preferable to contain a polyoxyalkylene resin.

The above-mentioned polyoxyalkylene resin can be decomposed to hydrocarbons, ethers and the like with low molecular weights and successively disappears due to phase alteration such as combustion reaction or evaporation by heating at a prescribed temperature in a range from 100 to 300° C. Accordingly, the above-mentioned thermal disappearing can be exhibited by heating at a prescribed temperature in a range from 100 to 300° C.

The above-mentioned polyoxyalkylene resin is not particularly limited and preferably one kind of polymer selected from the group consisting of polyoxypropylene, polyoxyethylene and polyoxytetramethylene. If a polyoxyalkylene resin other than the above-exemplified polymers is used, it may become impossible to obtain the prescribed thermal disappearing or particle strength. Among them, a polyoxyalkylene is more preferable. To obtain the proper thermal disappearing property and particle strength, 50% by weight or higher of the above-mentioned polyoxyalkylene resin contained in the thermally disappearing hollow resin particle is preferably polyoxypropylene. With respect to the polyoxyalkylene resin, those used for the thermally disappearing resin particle of the present invention 3 may be used.

The content of the polyoxyalkylene resin in the thermally disappearing hollow resin particle of the present invention is 5% by weight in the lower limit. If it is lower than 5% by weight, the thermal disappearing property of the thermally disappearing hollow resin particle to be obtained may become insufficient. The upper limit is not particularly restricted and the thermally disappearing hollow resin particle may be made of solely the polyoxyalkylene resin.

The thermally disappearing hollow resin particle of the present invention may contain a decomposition-promoting agent in order that the thermally disappearing hollow resin particle may disappear within a short time at a low temperature. Non-limiting examples of the above-mentioned decomposition-promoting agent may be peroxides such as benzoyl peroxide and lauroyl peroxide; azo compounds such as 2,2'-azobisisobutyronitrile, 2-carbamoylazoformamide, and 1,1'-azobiscyclohexane-1-carbonitrile; and the like.

The average particle diameter of the thermally disappearing hollow resin particle of the present invention is preferably 0.01 to 500 μm. The inventors have found that decomposition of the thermally disappearing hollow resin particle of the present invention is promoted in the presence of oxygen such as air using oxygen as a catalyst. Further, the inventors have found that since the surface area of the particle is considerably increased if the average particle diameter is 500 μm or smaller, such decomposition using oxygen as a catalyst is accelerated. Accordingly, the average particle diameter is adjusted to be preferably 500 μm or smaller and more preferably 200 μm or smaller. If the average particle diameter is smaller than 0.01 μm or larger than 500 μm, it becomes difficult to obtain the particle by polymerization at a high yield.

Non-limiting methods of producing the thermally disappearing hollow resin particle of the present invention may be conventionally known polymerization methods such as suspension polymerization, emulsion polymerization, dispersion polymerization, soap-free polymerization, or miniemulsion polymerization, using a solution containing a polyoxyalkylene macromonomer or a monomer mixture containing the polyoxyalkylene macromonomer and another polymerizable monomer in combination with a hollowing agent. Such a method of producing the thermally disappearing hollow resin particle is also included in the present invention. Since the thermally disappearing hollow resin particle with a high hollow ratio can be easily obtained, the suspension polymerization method is preferable among these polymerization methods.

With respect to the polyoxyalkylene macromonomer; the monomer mixture containing the polyoxyalkylene macromonomer and another polymerizable monomer; and the like, those which are used in the method of producing the thermally disappearing resin particle of the present invention 1 or 2 may be used.

The above-mentioned hollowing agent is not particularly limited and an organic solvent with a boiling point from −50 to 200° C. is preferable since it is easy to handle in the case of drying in a hollowing step.

In the case an organic solvent with a boiling point from −50 to 200° C. is used as the above-mentioned hollowing agent, it is preferable that the solvent is mixed with the above-mentioned polyoxyalkylene macromonomer or monomer mixture to previously produce an even solution and suspension polymerization is carried out using the solution. Accordingly, the polyoxyalkylene macromonomer or monomer mixture is phase-separated from the organic solvent as the polymerization proceeds to obtain a particle which is a polymer particle in which the organic solvent is enclosed. After that, when the organic solvent enclosed in the obtained particle is evaporated and dried, hollow parts are left in the particle to obtain thermally disappearing hollow resin particle.

Non-limiting examples of the organic solvent with a boiling point from −50 to 200° C. are butane, isobutane, pentane, isopentane, hexane, cyclohexane, heptane, octane, isooctane, toluene, ethyl acetate, methyl ethyl ketone, acetone, methylene chloride, chloroform, tetrachloromethane and the like. These solvents may be used alone or in combination.

A medium to suspend the above-mentioned polyoxyalkylene macromonomer or monomer mixture with the hollowing agent is not particularly limited if it is not compatible with the above-mentioned polyoxyalkylene macromonomer or monomer mixture or the hollowing agent and examples are pure water, an aqueous solution and the like.

The thermally disappearing hollow resin particle of the present invention can be produced by a method which comprises the step of producing an emulsion containing a water-containing a hollowing agent enclosed in a polyoxyalkylene macromonomer or a monomer mixture containing a polyoxyalkylene macromonomer and another polymerizable monomer; the step of dispersing the emulsion in water; and the step of polymerizing the polyoxyalkylene macromonomer or the monomer mixture. Such a method of producing the thermally disappearing hollow resin particle is also included in the present invention.

In the production method, since a three-layer structure emulsion (W/O/W emulsion) is formed by dispersing an emulsion (W/O emulsion) enclosing the water-containing hollowing agent in the above-mentioned polyoxyalkylene macromonomer or monomer mixture in water, it is made possible, to more preferably obtain a particle which is polymer particle enclosing the water-containing hollowing agent. After that, when the hollowing agent enclosed in the obtained particle is evaporated and dried, hollow parts are left in the particle to produce thermally disappearing hollow resin particle. In order to stabilize the emulsion, various kinds of additives may be added to the respective layers of the above-mentioned W/O/W emulsion.

In the method of producing the thermally disappearing hollow resin particle of the present invention, the polyoxyalkylene resin and the hollowing agent may be coated by such as organic resin and encapsulated. Non-limiting methods of encapsulating may be a core-shellvation method, a drying-in-liquid method, an interface polymerization method, an in-situ polymerization method, and the like.

A ceramic composition of the present invention 1 is that which comprises a thermally disappearing resin particle containing a polyoxyalkylene resin and a ceramic powder, 10% by weight or more of the thermally disappearing resin particle disappearing within an hour by heating at a prescribed temperature in a range from 100 to 250° C.

The ceramic composition of the present invention 1 comprises a thermally disappearing resin particle and a ceramic powder.

In accordance with findings of investigations, the inventors have found that if the ceramic composition comprising the thermally disappearing resin particle which contains a polyoxyalkylene resin and of which 10% by weight or more disappear within an hour by heating at a prescribed temperature in a range from 100 to 250° C. in combination with a ceramic powder is used for production of a porous ceramic material, use of the composition can improve the production efficiency by shortening the time to be taken for firing step while providing good handling easiness and making the molding property excellent at a normal temperature and suppressing occurrence of cracking or the like, which is attributed to the combustion heat, in a molded product during the degreasing and firing step. These findings have led to completion of the ceramic composition of the present invention 1.

The above-mentioned thermally disappearing resin particle is that wherein 10% by weight or more of the thermally disappearing resin particle disappears within an hour by heating at a prescribed temperature in a range from 100 to 250° C. If the time to be taken for the disappearing exceeds an hour, the production efficiency is decreased. Further, if the disappearing portion is less than 10% by weight, the heat generation amount is decreased and it results in insufficiency of the effect for suppressing occurrence of cracking or the like in a molded product. It is preferable for the thermally disappearing resin particle that 40% by weight or more of the thermally disappearing resin particle disappear within an hour by heating at a prescribed temperature in a range from 100 to 250° C.

The 10% compressive strength of the above-mentioned thermally disappearing resin particle at 23° C. is preferably 1 MPa in the lower limit and 1000 MPa in the upper limit. If it is lower than 1 MPa, the thermally disappearing particle may be broken at the time of preparing the ceramic composition at a normal temperature to worsen the handling property. Further, even if the breakage is avoided owing to the flexibility of the particle, the particle is sometimes deformed to make it impossible to cause a prescribed pore-forming effect in some cases.

The average particle diameter of the above-mentioned thermally disappearing resin particle is preferably 0.01 to 500 μm. The inventors have found that decomposition of the thermally disappearing resin particle is promoted in the presence of oxygen such as air using oxygen as a catalyst. Further, the inventors have found that since the surface area of the particle is considerably increased if the average particle diameter is 500 μm or smaller, such decomposition using oxygen as a catalyst is accelerated. Accordingly, the average particle diameter is adjusted to be preferably 500 μm or smaller and more preferably 200 μm or smaller. If the average particle diameter is smaller than 0.01 μm or larger than 500 μm, it becomes difficult to obtain particles by polymerization at a high yield.

The above-mentioned thermally disappearing resin particle contains a polyoxyalkylene resin.

The above-mentioned polyoxyalkylene resin can be decomposed to hydrocarbons, ethers and the like with low molecular weights and successively disappears due to phase alteration such as combustion reaction or evaporation by heating at a prescribed temperature in a range from 100 to 250° C. Accordingly, addition of the polyoxyalkylene resin to the above-mentioned thermally disappearing resin particle gives the above-mentioned thermal disappearing property.

As the polyoxyalkylene resin, those usable for the thermally disappearing resin particle of the present invention 3 can be used.

The content of the polyoxyalkylene resin in the thermally disappearing resin particle is not particularly limited and preferably 10% by weight in the lower limit. If it is lower than 10% by weight, the thermal disappearing property of the thermally disappearing resin particle may sometimes become insufficient. The upper limit is not particularly limited and the thermally disappearing resin particle may comprise the polyoxyalkylene resin alone.

In order that the above-mentioned thermally disappearing resin particle may disappear at a low temperature within a short time, the thermally disappearing resin particle may contain a decomposition-promoting agent. Non-limiting examples of the above-mentioned decomposition-promoting agent may be peroxides such as benzoyl peroxide and lauroyl peroxide; azo compounds such as 2,2'-azobisisobutyronitrile, 2-carbamoylazoformamide, and 1,1'-azobiscyclohexane-1-carbonitrile; and the like.

A method of producing the thermally disappearing hollow resin particle is not particularly limited, however a suspension polymerization method using polyoxyalkylene macromonomer having a functional group alone or in combination with another polymerizable monomer in a solvent is preferable. With respect to the polyoxyalkylene macromonomer or the monomer mixture containing the polyoxyalkylene macromonomer and another polymerizable monomer, those which are used in the method of producing the thermally disappearing resin particle of the present invention 1 or 2 may be used.

Further, the thermally disappearing resin particle may be coated by such as organic resin and encapsulated. Non-limiting methods of encapsulating may be a core-shellvation method, a drying-in-liquid method, an interface polymerization method, an in-situ polymerization method or the like.

The ceramic composition of the present invention 1 contains a ceramic powder.

The above-mentioned ceramic powder is not particularly limited and preferably at least one kind of compound selected from the group consisting of metal oxides, metal carbides, and metal nitrides.

The above-mentioned metal oxides are not particularly limited and preferably cordierite. Cordierite means a composition comprising $SiO_2$ in a content of 42 to 56% by weight, $Al_2O_3$ in a content of 30 to 45% by weight, and MgO in a content of 12 to 16% by weight. The above-mentioned metal carbides are not particularly limited and preferably silicon carbide for example.

The above-mentioned metal nitrides are not particularly limited and preferably silicon nitride for example.

The above-mentioned ceramic powder is produced by properly adding, as an inorganic binder, a talc powder component such as talc and fired talc; a silica powder such as amorphous silica; kaolin, calcined kaolin, boron oxide, alumina, and aluminum hydroxide besides the above-mentioned metal oxides, metal carbides, and metal nitrides.

In this case, it is preferable to contain 50% by weight or more of at least one kind of compounds selected from the group consisting of cordierite, silicon carbide, and silicon nitride.

The mixing ratio of the above-mentioned thermally disappearing resin particle and ceramic powder in the ceramic composition of the present invention 1 is not particularly limited and the mixing ratio of the above-mentioned thermally disappearing resin particles is preferably 10% by weight in the lower limit and 90% by weight in the upper limit. If it is lower than 10% by weight, it may sometime become impossible to obtain a porous ceramic filter having a sufficient porosity and if it exceeds 90% by weight, the strength of the porous ceramic filter may sometimes decrease.

The ceramic composition of the present invention 1 may contain conventionally known additives such as a plasticizer and a tackifier on the basis of necessity.

When the ceramic composition of the present invention 1 is heated at a prescribed temperature in a range from 100 to 250° C., at least a portion of the thermally disappearing particles to be a pore-forming material disappear and thus degreasing can be carried out at a lower temperature than before. Accordingly, cracking and the like are hardly occurred in a molded product and it is made easy to produce a porous ceramic material having a very high porosity.

Non-limiting methods of producing a porous ceramic filter by using the ceramic composition of the present invention 1 may include a method involving preparing a formed product by forming the ceramic composition of the present invention 1 by a conventionally known method such as an extrusion molding method and a press molding method; drying the preform; and degreasing and firing the dried product.

The firing temperature may be set properly in accordance with the ceramic composition to be used and in the case of using a ceramic powder containing cordierite, it is preferably 1380 to 1440° C.; in the case of using a ceramic powder containing silicon carbide, it is preferably 1600 to 2200° C.; and in the case of using a ceramic powder containing silicon nitride, it is preferably 1500 to 1900° C.

The method of producing a porous ceramic filter by firing the ceramic composition of the present invention 1 is also included in the present invention.

The ceramic composition of the present invention 2 is that which comprises a thermally disappearing hollow resin particle and a ceramic powder, the thermally disappearing hollow resin particle having a hollow ratio at 23° C. of 5 to 95% by weight, and 10% by weight or more of the thermally disappearing hollow resin particle disappearing within an hour by heating at a prescribed temperature in a range from 100 to 300° C.

In accordance with results of investigations, the inventors have found that if the ceramic composition comprising the thermally disappearing resin particle which has a hollow ratio at 23° C. and a disappearing amount within an hour by heating at a prescribed temperature from 100 to 300° C. in respectively prescribed ranges in combination with a ceramic powder is used as a pore-forming material for the porous ceramic filter, the ceramic composition can improve the production efficiency by shortening the time to be taken for the degreasing and firing step while providing good handling easiness and making the molding property excellent at a normal temperature and suppressing deformation, which is attributed to the combustion heat, of a ceramic molded product during the degreasing and firing step. The inventors have also found that the ceramic composition can provide the porous ceramic filter free from deformation and cracking and give a high porosity. These findings have led to completion of the ceramic composition of the present invention 2.

The ceramic composition of the present invention 2 contains the thermally disappearing hollow resin particle and the hollow ratio of the thermally disappearing hollow resin particles at 23° C. is 5% in the lower limit and 95% in the upper limit. If it is lower than 5%, the effect of decreasing the combustion heat is insufficient and deformation and cracking are caused in a ceramic molded product. If it exceeds 95%, the particle strength of the thermally disappearing hollow resin particle is decreased and in the case the thermally disappearing hollow resin particle as a binder or a lightening material, it may become impossible to keep the particle shape. The hollow ratio is preferably 30% in the lower limit and 95% in the upper limit and more preferably 50% in the lower limit.

In this description, the hollow ratio means the ratio of the volume of the hollow part in the entire volume of the thermally disappearing hollow resin particle and may be measured using, for example, Porosimeter 2000 (manufactured by AMCO Co., Ltd.) and the like.

The above-mentioned thermally disappearing hollow resin particle is that wherein 10% by weight or more of the thermally disappearing hollow resin particle disappear within an hour by heating at a prescribed temperature in a range from 100 to 300° C. If the time to be taken for disappearing exceeds an hour, the production efficiency is decreased. If the portion of the thermally disappearing hollow resin particle is less than 10% by weight, the heat generation amount is decreased and the effect for suppressing deformation becomes insufficient. It is preferable for the thermally disappearing hollow resin particle that 40% by weight or more of the thermally disappearing hollow resin particle disappear within an hour by heating at a prescribed temperature in a range from 100 to 300° C.

The above-mentioned thermally disappearing hollow resin particle is preferable to contain a polyoxyalkylene resin. The above-mentioned polyoxyalkylene resin is decomposed to hydrocarbons, ethers and the like with low molecular weights and successively disappears due to phase alteration such as combustion reaction or evaporation by heating at a prescribed temperature in a range from 100 to 300° C. Accordingly, the thermally disappearing hollow resin particle can exhibit the above-mentioned thermal disappearing by heating at a prescribed temperature in a range from 100 to 300° C.

Non-limiting examples of the above-mentioned polyoxyalkylene resin may be preferably at least one kind of polymer selected from the group consisting of polyoxypropylene, polyoxyethylene and polyoxytetramethylene. If a polyoxyalkylene resin other than the above-exemplified polymers is used, it may become impossible to obtain the prescribed thermal disappearing or the particle strength. Polyoxyalkylene is more preferable among them. To obtain the proper thermal disappearing property and particle strength, 50% by weight or higher of the above-mentioned polyoxyalkylene resin contained in the thermally disappearing hollow resin particle is preferably polyoxypropylene. With respect to the polyoxyalkylene resin, those used for the thermally disappearing resin particle of the present invention 3 may be used.

The above-mentioned thermally disappearing hollow resin particle may contain a decomposition-promoting agent in order that the thermally disappearing hollow resin particle may disappear within a short time at a low temperature. Non-limiting examples of the above-mentioned decomposition-promoting agent may be peroxides such as benzoyl peroxide and lauroyl peroxide; azo compounds such as 2,2'-azobisisobutyronitrile, 2-carbamoylazoformamide, and 1,1'-azobiscyclohexane-1-carbonitrile; and the like.

The above-mentioned thermally disappearing hollow resin particle is preferable to contain a crosslinking component. Addition of the crosslinking component makes it possible to obtain the particle with high compressive strength and prevent occurrence of breakage of the particle at the time of ceramic molding at a normal temperature.

Non-limiting examples of the crosslinking component are acrylic type polyfunctional monomers such as trimethylolpropane tri(meth)acrylate and divinylbenzene.

The 10% compressive strength of the above-mentioned thermally disappearing hollow resin particle at 23° C. is preferably 1, MPa in the lower limit and 1000 MPa in the upper limit. If it is lower than 1 MPa, the particle may be broken at the time of ceramic molding at a normal temperature to make it impossible to obtain the intended pore-forming effect and if it exceeds 1000 MPa, screws of a molding apparatus may sometimes be damaged at the time of mixing with a ceramic powder and molding.

In this description, the 10% compressive strength means the pressure needed to compress the particle diameter of the thermally disappearing hollow resin particle by 10% and can be measured using a micro-hardness meter (manufactured by Fischer Instruments Inc.) and the like.

The decomposition starting temperature of the thermally disappearing hollow resin particle is preferably 110° C. in the lower limit and 250° C. in the upper limit. If it is lower than 110° C., decomposition is started before the firing step is carried out to lower the properties of a product to be obtained and if it exceeds 250° C., 10% by weight or more of the thermally disappearing hollow resin particle may not disappear within an hour.

In this description, the decomposition starting temperature means a temperature at which the weight. decrease ratio by heating reaches 5% or higher and can be measured by thermogravimetric analysis (TGA) using DSC-6200 (manufactured by Seiko Instruments Inc.).

In the case the thermally disappearing hollow resin particle is heated at a heating rate of 5° C./min, the 50% by weight decrease loss temperature is preferably 130° C. in the lower limit and 280° C. in the upper limit. If it is lower than 130° C., thermal decomposition proceeds before the firing step and the properties of the product to be obtained may be lowered and if it exceeds 280° C., residues such as carbon derived from the resin component may remain in the sintered body after firing.

The average particle diameter of the above-mentioned thermally disappearing hollow resin particle is preferably 0.01 to 500 μm. The inventors have found that decomposition of the above-mentioned thermally disappearing hollow resin particle is promoted in the presence of oxygen such as air using oxygen as a catalyst. Further, the inventors have found that since the surface area of the particle is considerably increased if the average particle diameter is 500 μm or smaller, such decomposition using oxygen as a catalyst is accelerated. Accordingly, the average particle diameter is adjusted to be preferably 500 μm or smaller and more preferably 200 μm or smaller. If the average particle diameter is smaller than 0.01 μm or larger than 500 μm, it becomes difficult to obtain the particle by polymerization at a high yield.

Non-limiting methods of producing the above-mentioned thermally disappearing hollow resin particle may be conventionally known polymerization methods of producing resin particle using a vinyl monomer and a hollowing agent in the presence of polyoxyalkylene resin, such as suspension polymerization, emulsion polymerization, dispersion polymerization, soap-free polymerization, or mini-emulsion polymerization.

Further, the above-mentioned polyoxyalkylene resin and the above-mentioned hollowing agent may be coated by such as organic resin and encapsulated. Non-limiting methods of encapsulating may be a core-shellvation method, a drying-in-liquid method, an interface polymerization method, an in-situ polymerization method and the like.

As a method of producing the thermally disappearing hollow resin particle, a suspension polymerization method is preferably by which a polyoxyalkylene macromonomer or a monomer mixture containing the polyoxyalkylene macromonomer and another polymerizable monomer in combination with a hollowing agent optionally mixed with another polymerizable monomer in a solvent. With respect to the polyoxyalkylene macromonomer or the monomer mixture containing the polyoxyalkylene macromonomer and another polymerizable monomer, those which are used in the method of producing the thermally disappearing resin particle of the present invention 1 or 2 may be used.

The above-mentioned hollowing agent is not particularly limited and an organic solvent with a boiling point from −50 to 200° C. is preferable since it is easy to handle in the case of drying in a hollowing step.

In the case an organic solvent with a boiling point from −50 to 200° C. is used as the above-mentioned hollowing agent, it is preferable that the solvent is mixed with the above-mentioned polyoxyalkylene macromonomer or monomer mixture to previously produce an even solution and suspension polymerization is carried out using the solution. Accordingly, the polyoxyalkylene macromonomer or monomer mixture is phase-separated from the organic solvent as the polymerization proceeds to obtain a particle which is a polymer particle in which the organic solvent is enclosed. After that, when the organic solvent enclosed in the obtained particle is evaporated and dried, hollow parts are left in the particle to obtain a thermally disappearing hollow resin particle.

Non-limiting examples of the organic solvent with a boiling point from −50 to 200° C. are butane, isobutane, pentane, isopentane, hexane, cyclohexane, heptane, octane, isooctane, toluene, ethyl acetate, methyl ethyl ketone, acetone, methylene chloride, chloroform, tetrachloromethane and the like. These solvents may be used alone or in combination.

A medium to suspend the above-mentioned polyoxyalkylene macromonomer or monomer mixture with the hollowing agent is not particularly limited if it is not compatible with the polyoxyalkylene macromonomer or monomer mixture or the hollowing agent and examples are pure water, an aqueous solution and the like.

The thermally disappearing hollow resin particle can be produced by a method which comprises the step of producing an emulsion containing a water-containing a hollowing agent enclosed in a polyoxyalkylene macromonomer or a monomer mixture containing a polyoxyalkylene macromonomer and another polymerizable monomer; the step of dispersing the emulsion in water; and the step of polymerizing the polyoxyalkylene macromonomer or the monomer mixture.

In the production method, since a three-layer structure emulsion (W/O/W emulsion) is formed by dispersing an emulsion (W/O emulsion) containing the water-containing hollowing agent in the polyoxyalkylene macromonomer or monomer mixture, it is made possible to more preferably obtain a particle which is a polymer particle enclosing the water-containing hollowing agent. After that, when the hollowing agent enclosed in the obtained particle is evaporated and dried, hollow parts are left in the particle to produce a thermally disappearing hollow resin particle. In order to stabilize the emulsion, various kinds of additives may be added to the respective layers of the above-mentioned W/O/W emulsion.

The ceramic composition of the present invention 2 can be obtained by mixing the above-mentioned thermally disappearing hollow resin particle and a ceramic powder. In the production of the porous ceramic filter, the above-mentioned ceramic powder is preferably at least one of compounds selected from the group consisting of metal oxide, metal carbide, and metal nitride. The above-mentioned metal oxide is not particularly limited and preferably cordierite. Further, as the above-mentioned metal carbide, silicon carbide is preferable and as the above-mentioned metal nitride, silicon nitride is preferable.

The above-mentioned cordierite means a composition containing $SiO_2$ in a content of 42 to 56% by weight, $Al_2O_3$ in a content of 30 to 45% by weight, and MgO in a content of 12 to 16% by weight. In the production of the cordierite, non-limiting examples of ceramic raw materials are a talc powder component such as talc and fired talc; silica powder such as amorphous silica; kaolin, calcined kaolin, alumina, and aluminum hydrocarbon, and the like.

The ceramic composition containing the silicon carbide powder as a main component is produced by properly adding, as an inorganic binder, a talc powder component such as talc and fired talc; a silica powder such as amorphous silica; kaolin, calcined kaolin, boron oxide, alumina, aluminum hydroxide and the like to a silicon carbide powder and further mixing the obtained powder mixture with the thermally disappearing hollow resin particle.

The ceramic composition containing the silicon nitride powder as a main component is produced by properly adding, as an inorganic binder, iron nitride, talc, a talc powder component; a silica powder such as amorphous silica; kaolin, calcined kaolin, boron oxide, alumina, aluminum hydroxide and the like to a silicon nitride powder and further mixing the obtained powder mixture with the thermally disappearing hollow resin particle.

The method of producing a porous ceramic filter using the ceramic composition of the present invention 2 is not particularly limited and the porous ceramic filter can be produced by degreasing and firing the above-mentioned ceramic composition. The additive amount of the thermally disappearing hollow resin particle in the ceramic composition of the present invention 2 is not particularly limited and the additive amount of the thermally disappearing hollow resin particle is preferably 10% by weight in the lower limit and 90% by weight in the upper limit. If it is lower than 10% by weight, it may sometimes become impossible to cause an effect of increasing pores and if it exceeds 90% by weight, the strength of the porous ceramic filter after firing may sometimes decrease.

The method of producing the porous ceramic filter by firing the ceramic composition of the present invention 2 is also included in the present invention.

In the method of producing the porous ceramic filter of the present invention 2, non-limiting methods of forming the ceramic composition are a method forming a column-like continuously molded product having a desired cross-sectional form of a molded product by extrusion molding method and cutting the continuously molded product into the size of the molded product and a molding method using press-molding. The ceramic composition of the present invention 2 may be plasticized by adding a solvent, a plasticizer, a tackifier and the like to as in the case of a conventionally known composition.

The molded product is generally dried and successively degreased and fired. Although differing on the composition of the ceramic com position, the firing temperature is preferably 1380 to 1440° C. in the case of using the above-mentioned cordierite composition. In the case of using a silicon carbide composition, it is preferably 1600 to 2200° C.; and in the case of using a silicon nitride composition, it is preferably 1500 to 1900° C.

EFFECT OF THE INVENTION

Accordingly, the present invention provides a thermally disappearing resin particle and a thermally disappearing hollow resin particle which can be decomposed at a low temperature in a short time and do not cause deformation or cracking of a sintered body to be obtained in the case of using as a binder for a ceramic or a lightening material; a method of producing the thermally disappearing hollow resin particle; a ceramic composition which can be degreased and fired at a low temperature in a short time and gives a molded body with a high porosity without deformation or cracking even in the case a large quantity of a pore-forming material is used; and a method of producing a porous ceramic filter.

MODE FOR CARRYING OUT THE INVENTION

Hereinafter, the present invention will be described in details with reference to examples, however the present invention is not limited to these examples.

EXAMPLE 1

As monomer components, 80 parts by weight of polyoxypropylene dimethacrylate (the number of polyoxypropylene unit=about 9; Blemmer PDP-400; manufactured by NOF CORPORATION) and 20 parts by weight of methyl methacrylate, and as a polymerization initiator, 0.3 parts by weight of azobisisobutyronitrile (AIBN) were mixed and stirred to obtain a monomer solution.

The entire amount of the obtained monomer solution was added to 300 parts by weight of an aqueous solution comprising 1% by weight of polyvinyl alcohol (PVA) and 0.02% by weight of sodium nitrite and stirred by a stirring and dispersing apparatus to obtain an emulsified dispersion.

Next, using a 20 L-capacity polymerization reactor equipped with a stirrer, a jacket, a refluxing condenser, and a thermometer, after the pressure of the polymerization reactor was reduced to deoxygenate the polymerization reactor, the pressure was turned back to the atmospheric pressure by nitrogen gas to keep the inside of the polymerization reactor in the nitrogen atmosphere. The entire amount of the obtained emulsified dispersion was collectively added to the polymerization reactor and the polymerization reactor was heated to 60° C. and polymerization was started. After polymerization was carried out for 8 hours, the polymerization reactor was cooled to room temperature to obtain a slurry. The obtained slurry was dewatered by a dewatering apparatus and vacuum-dried to obtain resin particles. The particle diameter of the obtained resin particles was found to be 58 μm by measurement.

EXAMPLE 2

Particles were obtained in the same manner as Example 1, except that 80 parts by weight of polyoxyethylene-polyoxytetramethylene methacrylate (the number of polyoxyethylene unit=about 10; the number of polyoxytetramethylene unit=about 5; Blemmer 55PET-800; manufactured by NOF CORPORATION), 10 parts by weight of methyl methacrylate, and 10 parts by weight of trimethylolpropane trimethacrylate were used as the monomer components. The particle diameter of the obtained resin particles was found to be 55 μm by measurement.

EXAMPLE 3

As monomer components, 40 parts by weight of polyoxypropylene dimethacrylate (the number of polyoxypropylene unit=about 13; Blemmer PDP-700; manufactured by NOF CORPORATION), 40 parts by weight of polyoxyethylene dimethacrylate (the number of polyoxyethylene unit=about 2; Blemmer PDE-100; manufactured by NOF CORPORATION), and 20 parts by weight of methyl methacrylate, 5 parts by weight of hexadecane, and as a polymerization initiator, 0.3 parts by weight of azobisisobutyronitrile (AIBN) were mixed and stirred to obtain a monomer solution.

The entire amount of the obtained monomer solution was added to 300 parts by weight of an aqueous solution comprising 1% by weight of sodium dodecylbenzenesulfonate and stirred by an ultrasonic homogenizer to obtain an emulsified dispersion.

Next, using a 20 L-capacity polymerization reactor equipped with a stirrer, a jacket, a refluxing condenser, and a thermometer, after the pressure of the polymerization reactor was reduced to deoxygenate the polymerization reactor, the pressure was turned back to the atmospheric pressure by nitrogen gas to keep the inside of the polymerization reactor in the nitrogen atmosphere. The entire amount of the obtained emulsified dispersion was collectively added to the polymerization reactor and the polymerization reactor was heated to 60° C. and polymerization was started. After polymerization was carried out for 8 hours, the polymerization reactor was cooled to room temperature to obtain a slurry resin particles. The obtained resin particles in form of the slurry were diluted with ion-exchanged water and the particle diameter was found to be 480 nm by measurement.

COMPARATIVE EXAMPLE 1

Particles were obtained in the same manner as Example 1, except that 5 parts by weight of polyoxyethylene methacrylate (the number of polyoxyethylene unit=about 8; Blemmer PET-350; manufactured by NOF CORPORATION), 85 parts by weight of methyl methacrylate, and 10 parts by weight of trimethylolpropane trimethacrylate were used as the monomer components. The particle diameter of the obtained resin particles was found to be 45 μm by measurement.
(Evaluation)
The following evaluations were carried out for the thermally disappearing resin particles obtained in Examples 1 to 3 and Comparative Example 1.
(1) Measurement of Heating Loss
The decomposition starting temperature and the 50% by weight loss temperature were measured at a temperature increasing rate of 5° C./min using DSC-6200 (manufactured by Seiko Instruments Inc.). Moreover, the weight reduction rate at 300° C. was measured.
(2) 10% Compressive Strength
The 10% compressive strength of the obtained thermally disappearing resin particles was measured by a micro-hardness meter (manufactured by Fischer Instruments Inc.). The average value of the 10% compressive strength at 23° C. for randomly selected 5 particles of each thermally disappearing resin particle sample was measured.

ing 1% by weight of polyvinyl alcohol (PVA) and 0.02% by weight of sodium nitrite and stirred by a stirring and dispersing apparatus to obtain an emulsified dispersion.

Next, using a 20 L-capacity polymerization reactor equipped with a stirrer, a jacket, a refluxing condenser, and a thermometer, after the pressure of the polymerization reactor was reduced to deoxygenate the polymerization reactor, the pressure was turned back to the atmospheric pressure by nitrogen gas to keep the inside of the polymerization reactor in the nitrogen atmosphere. The entire amount of the obtained emulsified dispersion was collectively added to the polymerization reactor and the polymerization reactor was heated to 60° C. and polymerization was started. After polymerization was carried out for 8 hours, the polymerization reactor was cooled to room temperature to obtain a slurry. The obtained slurry was dewatered by a dewatering apparatus and vacuum-dried to obtain thermally disappearing resin particles.

The particle diameter of the obtained thermally disappearing resin particles was found to be 60 μm by measurement.

EXAMPLE 5

Thermally disappearing resin particles were obtained in the same manner as Example 4, except that 50 parts by weight of polyoxypropylene dimethacrylate (the number of polyoxypropylene unit=about 9; Blemmer PDP-400; manufactured by NOF CORPORATION) and 50 parts by weight of methyl methacrylate were used as the monomer components and 5 parts by weight of hydroperoxide (Perocta H, manufactured by NOF CORPORATION) was used as the decomposition-promoting agent. The particle diameter of the obtained thermally disappearing resin particles was found to be 57 μm by measurement.

EXAMPLE 6

Thermally disappearing resin particles were obtained in the same manner as Example 4, except that 80 parts by weight of polyoxyethylene-polyoxytetramethylene methacrylate (the number of polyoxyethylene unit=about 10; the number of polyoxytetramethylene unit=about 5; Blemmer 55PET-800; manufactured by NOF CORPORATION) and 20 parts by weight of methyl methacrylate were used as the monomer

TABLE 1

|  | Example 1 | Example 2 | Example 3 | Comparative Example 1 |
| --- | --- | --- | --- | --- |
| average particle diameter(μm) | 58 | 55 | 0.48 | 45 |
| decomposition starting temperature(° C.) | 170 | 150 | 160 | 240 |
| 50% by weight loss temperature(° C.) | 230 | 220 | 215 | — |
| weight decrease ratio at 300° C.(% by weight) | 80 | 80 | 95 | 8 |
| 10% compressive strength(MPa) | 5 | 14 | — | 87 |

EXAMPLE 4

As monomer components, 80 parts by weight of polyoxypropylene dimethacrylate (the number of polyoxypropylene unit=about 13; Blemmer PDP-700; manufactured by NOF CORPORATION) and 20 parts by weight of methyl methacrylate; as a decomposition-promoting agent, 1 part by weight of peroxyketal (Perhexa V, manufactured by NOF CORPORATION); and as a polymerization initiator, 0.3 parts by weight of azobisisobutyronitrile (AIBN) were mixed and stirred to obtain a monomer solution.

The entire amount of the obtained monomer solution was added to 300 parts by weight of an aqueous solution comprising components, and 1 part by weight of dialkyl peroxide (Perhexine 25B, manufactured by NOF CORPORATION) and 5 parts by weight of hydroperoxide (Percumyl P, manufactured by NOF CORPORATION) were used as the decomposition-promoting agent.

The particle diameter of the obtained thermally disappearing resin particles was found to be 45 μm by measurement.

COMPARATIVE EXAMPLE 2

Thermally disappearing resin particles were obtained in the same manner as Example 4, except that no decomposition-promoting agent was used.

The particle diameter of the obtained thermally disappearing resin particles was found to be 58 μm by measurement.

COMPARATIVE EXAMPLE 3

Thermally disappearing resin particles were obtained in the same manner as Example 4, except that 10 parts by weight of polyoxypropylene dimethacrylate (the number of polyoxypropylene unit=about 9; Blemmer PDP-400; manufactured by NOF CORPORATION) and 90 parts by weight of methyl methacrylate were used as the monomer components and no decomposition-promoting agent was used.

The particle diameter of the obtained thermally disappearing resin particles was found to be 52 μm by measurement.
(Evaluation)

The decomposition starting temperature, 50% by weight loss temperature, and weight decrease ratio at 250° C. were measured in the above-mentioned methods for the thermally disappearing resin particles obtained in Examples 4 to 6 and Comparative Examples 2 and 3.

The results are shown in Table 2.

TABLE 2

|  | Example 4 | Example 5 | Example 6 | Comparative Example 2 | Comparative Example 3 |
|---|---|---|---|---|---|
| average particle diameter(μm) | 60 | 57 | 45 | 58 | 52 |
| decomposition starting temperature(° C.) | 135 | 140 | 135 | 170 | 210 |
| 50% by weight loss temperature(° C.) | 165 | 205 | 185 | 230 | 350 |
| weight decrease ratio at 250° C.(% by weight) | 80 | 80 | 90 | 80 | 7 |

EXAMPLE 7

As monomer components, 50 parts by weight of polyoxypropylene dimethacrylate (the number of polyoxypropylene unit=about 9; Blemmer PDP-400; manufactured by NOF CORPORATION), 30 parts by weight of methyl methacrylate, and 20 parts by weight of trimethylolpropane trimethacrylate; as a hollowing agent, 50 parts by weight of heptane; and as a polymerization initiator, 0.3 parts by weight of azobisisobutyronitrile (AIBN) were mixed and stirred to obtain a monomer solution.

The entire amount of the obtained monomer solution was added to 450 parts by weight of an aqueous solution comprising 1% by weight of polyvinyl alcohol (PVA) and 0.02% by weight of sodium nitrite and stirred by a stirring and dispersing apparatus to obtain an emulsified dispersion.

Next, using a 20 L-capacity polymerization reactor equipped with a stirrer, a jacket, a refluxing condenser, and a thermometer, after the pressure of the polymerization reactor was reduced to deoxygenate the polymerization reactor, the pressure was turned back to the atmospheric pressure by nitrogen gas to keep the inside of the polymerization reactor in the nitrogen atmosphere. The entire amount of the obtained emulsified dispersion was collectively added to the polymerization reactor and the polymerization reactor was heated to 60° C. and polymerization was started. After polymerization was carried out for 8 hours, the polymerization reactor was cooled to room temperature to obtain a slurry. The obtained slurry was dewatered by a dewatering apparatus and vacuum-dried to obtain thermally disappearing resin particles. The particle diameter of the obtained thermally disappearing resin particles was found to be 52 μm by measurement.

EXAMPLE 8

As monomer components, 50 parts by weight of polyoxypropylene dimethacrylate (the number of polyoxypropylene unit=about 9; Blemmer PDP-400; manufactured by NOF CORPORATION), 30 parts by weight of methyl methacrylate, and 20 parts by weight of trimethylolpropane trimethacrylate; as an emulsifying dispersant, 4 parts by weight of polyglycerin fatty acid ester (Poem PR-10, manufactured by Riken Vitamin Co., Ltd.); and as a polymerization initiator, 0.3 parts by weight of azobisisobutyronitrile (AIBN) were mixed and stirred to obtain a monomer solution.

A W/O emulsion was produced by adding 40 parts by weight of an aqueous solution comprising 0.5% by weight of sodium chloride to 60 parts by weight of the obtained monomer solution and emulsifying the mixture. Successively, a W/O/W emulsion was produced by adding. 100 parts by weight of the obtained W/O emulsion to 300 parts by weight of an aqueous solution comprising 1% by weight of polyvinyl alcohol (PVA) and 0.02% by weight of sodium nitrate and stirring the obtained mixture by a stirring and dispersing apparatus.

Next, using a 20 L-capacity polymerization reactor equipped with a stirrer, a jacket, a refluxing condenser, and a thermometer, after the pressure of the polymerization reactor was reduced to deoxygenate the polymerization reactor, the pressure was turned back to the atmospheric pressure by nitrogen gas to keep the inside of the polymerization reactor in the nitrogen atmosphere. The entire amount of the obtained W/O/W emulsion was collectively added to the polymerization reactor and the polymerization reactor was heated to 60° C. and polymerization was started. After polymerization was carried out for 8 hours, the polymerization reactor was cooled to room temperature to obtain a slurry. The obtained slurry was dewatered by a dewatering apparatus and vacuum-dried to obtain resin particles. The particle diameter of the obtained resin particles was found to be 50 μm by measurement.

EXAMPLE 9

Hollow resin particles were obtained in the same manner as Example 7, except that 35 parts by weight of polyoxyethylene-polyoxytetramethylene methacrylate (the number of polyoxyethylene unit=about 10; the number of polyoxytetramethylene unit=about 5; Blemmer 55PET-800; manufactured by NOF CORPORATION), 50 parts by weight of methyl methacrylate, and 20 parts by weight of trimethylolpropane trimethacrylate were used as the monomer components and 120 parts by weight of isooctaone was used as the hollowing agent. The particle diameter of the obtained hollow resin particles was found to be 56 μm by measurement.

COMPARATIVE EXAMPLE 4

Resin particles were obtained in the same manner as Example 7, except that 5 parts by weight of polyoxyethylene methacrylate (the number of polyoxyethylene unit=about 8; Blemmer PET-350; manufactured by NOF CORPORATION), 85 parts by weight of methyl methacrylate, and 10 parts by weight of trimethylolpropane trimethacrylate were used as the monomer components. The particle diameter of the obtained resin particles was found to be 45 μm by measurement.

(Evaluation)

The following evaluations were carried out for the resin particles obtained in Examples 7 to 9 and Comparative Example 4. The results are shown in Table 3.

(1) Measurement of the Hollow Ratio

The hollow ratio was measured using 0.5 g of the obtained resin particles of each sample by Porosimeter 2000 (manufactured by AMCO Co., Ltd.). The measurement temperature was adjusted at 23° C. and the sealing mercury pressure was adjusted at 2000 kg/cm².

(2) Measurement of Heating Loss

The decomposition starting temperature and the 50% by weight loss temperature were measured at a temperature increasing rate of 5° C./min using DSC-6200 (manufactured by Seiko Instruments Inc.). The weight loss ratio after heating at 300° C. for an hour was also measured.

(3) Measurement of Heat Generation Amount

The heat generation amount was measured from 100° C. to 500° C. using a heat amount measurement apparatus (manufactured by Yoshida Seisakusho Co., Ltd.) according to the method standardized in JIS M 8814. The heat generation amount per volume was calculated according to the following equation.

Heat generation amount (cal/ml)=heat generation amount (cal/g)×(1−hollow ratio/100)

cooled to obtain a slurry. The obtained slurry was dewatered by a dewatering apparatus and vacuum-dried to obtain resin particles. The particle diameter of the obtained resin particles was found to be 58 μm by measurement.

(2) Preparation of Ceramic Composition

A ceramic composition was obtained by mixing 100 parts by weight of a ceramic powder comprising 40% by weight of talc, 20% by weight of kaolin, 18% by weight of alumina, 12% by weight of aluminum hydroxide, and 10% by weight of silica to 50 parts by weight of the obtained resin particles.

(3) Production of Porous Ceramic Filter

An extrusion-moldable clay was obtained by adding 4 parts by weight of methyl cellulose and water to the entire amount of the obtained ceramic composition and kneading the mixture. A cylindrical honeycomb structure body with rib thickness of 430 μm, 16 cells/cm², diameter of 118 mm and height of 152 mm was obtained by extrusion-molding method using the obtained clay.

After being dried, the obtained cylindrical honeycomb structure body was heated to 400° C. at 10° C./min heating rate and kept at the temperature for 1 hour to degrease the resin particles. After that, the cylindrical honeycomb structure body was fired by heating at 40° C./h heating rate to the maximum temperature of 1410° C. and kept at the temperature for 6 hours to obtain a porous ceramic filter.

When the obtained porous ceramic filter was observed with eyes, there was no occurrence of deformation such as expansion or cracking. The porosity was measured at a sealing

TABLE 3

|  | Example 7 | Example 8 | Example 9 | Comparative Example 4 |
|---|---|---|---|---|
| average particle diameter(μm) | 52 | 50 | 56 | 45 |
| hollow ratio(%) | 35 | 41 | 59 | 0 |
| decomposition starting temperature(° C.) | 170 | 170 | 160 | 240 |
| 50% by weight loss temperature(° C.) | 210 | 210 | 235 | 340 |
| weight decrease ratio at 300° C.(% by weight) | 92 | 94 | 80 | 8 |
| heat generation amount (cal/g) from 100 to 500° C. | 6320 | 6580 | 6740 | 6920 |
| heat generation amount (cal/ml) from 100 to 500° C. | 4110 | 3880 | 2760 | 6370 |

EXAMPLE 10

(1) Preparation of Thermally Disappearing Resin Particles

As monomer components, 80 parts by weight of polyoxypropylene dimethacrylate (the number of polyoxypropylene unit=about 7; Blemmer PDP-400; manufactured by NOF CORPORATION) and 20 parts by weight of methyl methacrylate; and as a polymerization initiator, 0.3 parts by weight of azobisisobutyronitrile (AIBN) were mixed and stirred to obtain a monomer solution.

The entire amount of the obtained monomer solution was added to 300 parts by weight of ion-exchanged water comprising 1% by weight of polyvinyl alcohol (PVA) and 0.02% by weight of sodium nitrite and stirred by a stirring and dispersing apparatus to obtain an emulsified dispersion.

Next, using a 20 L-capacity polymerization reactor equipped with a stirrer, a jacket, a refluxing condenser, and a thermometer, after the pressure of the polymerization reactor was reduced to deoxygenate the polymerization reactor, the pressure was turned back to the atmospheric pressure by nitrogen gas to keep the inside of the polymerization reactor in the nitrogen atmosphere. The entire amount of the obtained emulsified dispersion was collectively added to the polymerization reactor and the polymerization reactor was heated to 60° C. and polymerization was started. After polymerization was carried out for 8 hours, the polymerization reactor was mercury pressure of 2000 kg/cm² using Porosimeter 2000 manufactured by AMCO Co., Ltd. to find it was 72%.

EXAMPLE 11

A ceramic composition was obtained by adding 100 parts by weight of a ceramic powder comprising 98.5% by weight of silicon nitride and 1.5% by weight of iron nitride to 20 parts by weight of the resin particles obtained in Example 10.

An extrusion-moldable clay was obtained by adding 4 parts by weight of methyl cellulose and water to the entire amount of the obtained ceramic composition and kneading the mixture. A rectangular parallelepiped honeycomb structure body with rib thickness of 300 μm, 16 cells/cm², one side length of cross-section of 50 mm, and height of 250 mm was obtained by extrusion-molding method using the obtained clay.

After being dried, the obtained rectangular parallelepiped honeycomb structure was heated to 400° C. at 10° C./min heating rate and kept at the temperature for 1 hour to degrease the resin particles. After that, the honeycomb structure was fired in an inert gas atmosphere by heating at 40° C./h heating rate to the maximum temperature of 1700° C. and kept at the temperature for 6 hours to obtain a porous ceramic filter. When the obtained porous ceramic filter was observed with eyes, there was no occurrence of deformation such as expansion or cracking. The porosity was measured at a sealing mercury pressure of 2000 kg/cm² using Porosimeter 2000 manufactured by AMCO Co., Ltd. to find it was 63%.

EXAMPLE 12

(1) Preparation of Thermally Disappearing Resin Particles

Resin particles were obtained in the same manner as Example 10, except that 80 parts by weight of polyoxyethylene-polyoxytetramethylene methacrylate (the number of polyoxyethylene unit=about 10; the number of polyoxytetramethylene unit=about 5; Blemmer 55PET-800; manufactured by NOF CORPORATION), 10 parts by weight of methyl methacrylate and 10 parts by weight of trimethylolpropane trimethacrylate were used as monomer components. The particle diameter of the obtained resin particles was found to be 55 μm by measurement.

(2) Preparation of Ceramic Composition

A ceramic composition was obtained by mixing 100 parts by weight of a ceramic powder comprising 90% by weight of SiC, 5% by weight of boron oxide, 2% by weight of kaolin, and 3% by weight of alumina to 20 parts by weight of the obtained resin particles.

(3) Production of Porous Ceramic Filter

An extrusion-moldable clay was obtained by adding 8 parts by weight of methyl cellulose and water to the entire amount of the obtained ceramic composition and kneading the mixture. A rectangular parallelepiped honeycomb structure body with rib thickness of 300 μm, 16 cells/cm², one side length of cross-section of 50 mm, and height of 250 mm was obtained by extrusion-molding method using the obtained clay.

After being dried, the obtained rectangular parallelepiped honeycomb structure body was heated to 400° C. at 10° C./min heating rate and kept at the temperature for 1 hour to degrease the resin particles. After that, the rectangular parallelepiped honeycomb structure body was fired by heating at 40° C./h heating rate to the maximum temperature of 2100° C. and kept at the temperature for 6 hours to obtain a porous ceramic filter.

When the obtained porous ceramic filter was observed with eyes, there was no occurrence of deformation such as expansion or cracking. The porosity was measured at a sealing mercury pressure of 2000 kg/cm² using Porosimeter 2000 manufactured by AMCO Co., Ltd. to find it was 65%.

EXAMPLE 13

(1) Preparation of Thermally Disappearing Resin Particles

Resin particles were obtained in the same manner as Example 10, except that 90 parts by weight of polyoxypropylene methacrylate (the number of polyoxypropylene unit=about 13; Blemmer PP-800; manufactured by NOF CORPORATION), 9 parts by weight of methyl methacrylate and 1 part by weight of trimethylolpropane trimethacrylate were used as monomer components. The particle diameter of the obtained resin particles was found to be 62 μm by measurement.

(2) Preparation of Ceramic Composition

A ceramic composition was obtained by mixing 100 parts by weight of a ceramic powder comprising 90% by weight of SiC, 5% by weight of boron oxide, 2% by weight of kaolin, and 3% by weight of alumina to 20 parts by weight of the obtained resin particles.

(3) Production of Porous Ceramic Filter

An extrusion-moldable clay was obtained by adding 8 parts by weight of methyl cellulose and water to the entire amount of the obtained ceramic composition and kneading the mixture. A rectangular parallelepiped honeycomb structure body with rib thickness of 300 μm, 16 cells/cm², one side length of cross-section of 50 mm, and height of 250 mm was obtained by extrusion-molding method using the obtained body.

After being dried, the obtained rectangular parallelepiped honeycomb structure body was heated to 400° C. at 10° C./min heating rate and kept at the temperature for 1 hour to degrease the resin particles. After that, the rectangular parallelepiped honeycomb structure body was fired by heating at 40° C./h heating rate to the maximum temperature of 2100° C. and kept at the temperature for 6 hours to obtain a porous ceramic filter.

When the obtained porous ceramic filter was observed with eyes, there was no occurrence of deformation such as expansion or cracking. The porosity was measured at a sealing mercury pressure of 2000 kg/cm² using Porosimeter 2000 manufactured by AMCO Co., Ltd. to find it was 45%.

COMPARATIVE EXAMPLE 5

(1) Preparation of Thermally Disappearing Resin Particles

Resin particles were obtained in the same manner as Example 10, except that 5 parts by weight of polyoxyethylene methacrylate (the number of polyoxyethylene unit=about 8; Blemmer PET-350; manufactured by NOF CORPORATION), 85 parts by weight of methyl methacrylate and 10 parts by weight of trimethylolpropane trimethacrylate were used as monomer components. The particle diameter of the obtained resin particles was found to be 45 μm by measurement.

(2) Preparation of Ceramic Composition

A ceramic composition was obtained by mixing 100 parts by weight of a ceramic powder comprising 90% by weight of SiC, 5% by weight of boron oxide, 2% by weight of kaolin, and 3% by weight of alumina to 20 parts by weight of the obtained resin particles.

(3) Production of Porous Ceramic Filter

An extrusion-moldable clay was obtained by adding 8 parts by weight of methyl cellulose and water to the entire amount of the obtained ceramic composition and kneading the mixture. A rectangular parallelepiped honeycomb structure body with rib thickness of 300 μm, 16 cells/cm², one side length of cross-section of 50 mm, and height of 250 mm was obtained by extrusion-molding method using the obtained clay.

After being dried, the obtained rectangular parallelepiped honeycomb structure body was heated to 400° C. at 10° C./min heating rate and kept at the temperature for 1 hour to degrease the resin particles. After that, the rectangular parallelepiped honeycomb structure body was fired by heating at 40° C./h heating rate to the maximum temperature of 2100° C. and kept at the temperature for 6 hours to obtain a porous ceramic filter.

When the obtained porous ceramic filter was observed with eyes, expansion supposedly attributed to jetting decomposition gas of the resin particles was observed and cracking occurred. The porosity could not be measured because of such defective structure.

(Evaluation)

The following evaluations were carried out for the thermally disappearing resin particles obtained in Examples 10 to 13 and Comparative Example 5. The results are shown in Table 4.

(1) Measurement of Heating Loss

The decomposition starting temperature and the 50% by weight loss temperature were measured at a temperature increasing rate of 5° C./min using DSC-6200 (manufactured by Seiko Instruments Inc.). The weight loss ratio at 250° C. was also measured.

(2) 10% Compressive Strength

The 10% compressive strength of the obtained thermally disappearing resin particles was measured by a micro-hardness meter (manufactured by Fischer Instruments Inc.). The average value of the 10% compressive strength at 23° C. for 5 randomly selected 5 particles of each thermally disappearing resin particle sample was measured.

After being dried, the obtained honeycomb structure body was heated to 400° C. at 10° C./min heating rate and kept at the temperature for 1 hour to degrease the pore-forming material. After that, the honeycomb structure was fired by heating at 40° C./h heating rate to the maximum temperature of 1700° C. and kept at the temperature for 6 hours to obtain a porous ceramic filter.

TABLE 4

|  | Example 10 | Example 11 | Example 12 | Example 13 | Comparative Example 5 |
|---|---|---|---|---|---|
| average particle diameter($\mu$m) | 58 | 58 | 55 | 62 | 45 |
| decomposition starting temperature(° C.) | 150 | 150 | 140 | 140 | 220 |
| 50% by weight loss temperature(° C.) | 195 | 195 | 180 | 175 | — |
| weight decrease ratio at 250° C.(% by weight) | 87 | 87 | 91 | 93 | 7 |
| 10% compressive strength(MPa) | 5 | 5 | 14 | 0.6 | 87 |

EXAMPLE 14

(1) Preparation of Resin Particles

As monomer components, 50 parts by weight of polyoxypropylene dimethacrylate (the number of polyoxypropylene unit=about 9; Blemmer PDP-400; manufactured by NOF CORPORATION), 30 parts by weight of methyl methacrylate, and 20 parts by weight of trimethylolpropane trimethacrylate; as a hollowing agent, 50 parts by weight of heptane; and as a polymerization initiator, 0.3 parts by weight of azobisisobutyronitrile (AIBN) were mixed and stirred to obtain a monomer solution.

The entire amount of the obtained monomer solution was added to 450 parts by weight of an aqueous solution comprising 1% by weight of polyvinyl alcohol (PVA) and 0.02% by weight of sodium nitrite and stirred by a stirring and dispersing apparatus to obtain an emulsified dispersion.

Next, using a 20 L-capacity polymerization reactor equipped with a stirrer, a jacket, a refluxing condenser, and a thermometer, after the pressure of the polymerization reactor was reduced to deoxygenate the polymerization reactor, the pressure was turned back to the atmospheric pressure by nitrogen gas to keep the inside of the polymerization reactor in the nitrogen atmosphere. The entire amount of the obtained emulsified dispersion was collectively added to the polymerization reactor and the polymerization reactor was heated to 60° C. and polymerization was started. After polymerization was carried out for 8 hours, the polymerization reactor was cooled to room temperature to obtain a slurry. The obtained slurry was dewatered by a dewatering apparatus and vacuum-dried to obtain resin particles. The particle average diameter of the obtained resin particles was found to be 52 $\mu$m by measurement.

(2) Preparation of Ceramic Composition

A ceramic composition was obtained by mixing 100 parts by weight of a ceramic powder comprising 98.5% by weight of silicon nitride and 1.5% by weight of iron nitride with 13 parts by weight of the obtained resin particles.

(3) Production of Porous Ceramic Filter

An extrusion-moldable clay was obtained by adding 10 parts by weight of methyl cellulose, 5 parts by weight of glycerin, and water to the entire amount of the obtained ceramic composition and kneading the mixture. A rectangular parallelepiped honeycomb structure body with rib thickness of 300 $\mu$m, 16 cells/cm², one side length of cross-section of 50 mm, and height of 250 mm was obtained by extrusion-molding method using the obtained clay.

When the obtained porous ceramic filter was observed with eyes, there was no occurrence of deformation such as expansion or cracking. The porosity was measured at a sealing mercury pressure of 2000 kg/cm² using Porosimeter 2000 manufactured by AMCO Co., Ltd. to find it was 58%.

EXAMPLE 15

(1) Preparation of Resin Particles

As monomer components, 50 parts by weight of polyoxypropylene dimethacrylate (the number of polyoxypropylene unit=about 9; Blemmer PDP-400; manufactured by NOF CORPORATION), 30 parts by weight of methyl methacrylate, and 20 parts by weight of trimethylolpropane trimethacrylate; as an emulsifying dispersant, 4 parts by weight of polyglycerin fatty acid ester (Poem PR-100, manufactured by Riken Vitamin Co., Ltd.); and as a polymerization initiator, 0.3 parts by weight of azobisisobutyronitrile (AIBN) were mixed and stirred to obtain a monomer solution.

A W/O emulsion was produced by adding 40 parts by weight of an aqueous solution comprising 0.5% by weight of sodium chloride to 60 parts by weight of the obtained monomer solution and emulsifying the mixture. Successively, a W/O/W emulsion was produced by adding 100 parts by weight of the obtained W/O emulsion to 300 parts by weight of an aqueous solution comprising 1% by weight of polyvinyl alcohol (PVA) and 0.02% by weight of sodium nitrate and stirring the obtained mixture by a stirring and dispersing apparatus.

Next, using a 20 L-capacity polymerization reactor equipped with a stirrer, a jacket, a refluxing condenser, and a thermometer, after the pressure of the polymerization reactor was reduced to deoxygenate the reactor, the pressure was turned back to the atmospheric pressure by nitrogen gas to keep the inside of the polymerization reactor in the nitrogen atmosphere. The entire amount of the obtained W/O/W emulsion was collectively added to the polymerization reactor and the polymerization reactor was heated to 60° C. and polymerization was started. After polymerization was carried out for 8 hours, the polymerization reactor was cooled to room temperature to obtain a slurry. The obtained slurry was dewatered by a dewatering apparatus and vacuum-dried to obtain resin particles. The particle average diameter of the obtained resin particles was found to be 50 $\mu$m by measurement.

(2) Preparation of Ceramic Composition

A ceramic composition was obtained by mixing 100 parts by weight of a ceramic powder comprising 90% by weight of SiC, 5% by weight of boron oxide, 2% by weight of kaolin, and 3% by weight of alumina to 12 parts by weight of the obtained resin particles.

(3) Production of Porous Ceramic Filter

An extrusion-moldable clay was obtained by adding 10 parts by weight of methyl cellulose, 5 parts by weight of glycerin, and water to the entire amount of the obtained ceramic composition and kneading the mixture. A rectangular parallelepiped honeycomb structure body with rib thickness of 300 μm, 16 cells/cm$^2$, one side length of cross-section of 50 mm, and height of 250 mm was obtained by extrusion-molding method using the obtained clay.

After being dried, the obtained honeycomb structure body was heated to 400° C. at 10° C./min heating rate and kept at the temperature for 1 hour to degrease the pore-forming material. After that, the honeycomb structure body was fired by heating at 40° C./h heating rate in an inert gas atmosphere to the maximum temperature of 2100° C. and kept at the temperature for 6 hours to obtain a porous ceramic filter.

When the obtained porous ceramic filter was observed with eyes, there was no occurrence of deformation such as expansion or cracking. The porosity was measured at a sealing mercury pressure of 2000 kg/cm$^2$ using Porosimeter 2000 manufactured by AMCO Co., Ltd. to find it was 60%.

EXAMPLE 16

(1) Preparation of Resin Particles

Resin particles were obtained in the same manner as Example 14, except that 35 parts by weight of polyoxyethylene-polyoxytetramethylene methacrylate (the number of polyoxyethylene unit=about 10; the number of polyoxytetramethylene unit=about 5; Blemmer 55PET-800; manufactured by NOF CORPORATION), 50 parts by weight of methyl methacrylate, and 20 parts by weight of trimethylolpropane trimethacrylate were used as monomer components and 120 parts by weight of isooctane was used as a hollowing agent. The particle average diameter of the obtained resin particles was found to be 56 μm by measurement.

(2) Preparation of Ceramic Composition

A ceramic composition was obtained by mixing 100 parts by weight of a ceramic powder comprising 40% by weight of talc, 20% by weight of kaolin, 18% by weight of alumina, 12% by weight of aluminum hydroxide, and 10% by weight of silica to 28 parts by weight of the obtained resin particles.

(3) Production of Porous Ceramic Filter

An extrusion-moldable clay was obtained by adding 20 parts by weight of methyl cellulose, 10 parts by weight of glycerin, and water to the entire amount of the obtained ceramic composition and kneading the mixture. A cylindrical honeycomb structure body with rib thickness of 300 μm, 16 cells/cm$^2$, diameter of 30 mm and height of 100 mm was obtained by extrusion-molding method using the obtained clay.

After being dried, the obtained cylindrical honeycomb structure was heated to 400° C. at 10° C./min heating rate and kept at the temperature for 1 hour to degrease the pore-forming material. After that, the cylindrical honeycomb structure was fired by heating at 40° C./h heating rate to the maximum temperature of 1410° C. and kept at the temperature for 6-hours to obtain a porous ceramic filter.

When the obtained porous ceramic filter was observed with eyes, there was no occurrence of deformation such as expansion or cracking. The porosity was measured at a sealing mercury pressure of 2000 kg/cm$^2$ using Porosimeter 2000 manufactured by AMCO Co., Ltd. to find it was 67%.

EXAMPLE 17

(1) Preparation of Resin Particles

Resin particles were obtained in the same manner as Example 14, except that 30 parts by weight of polyoxypropylene dimethacrylate (the number of polyoxypropylene unit=about 9; Blemmer PDP-400; manufactured by NOF CORPORATION), 20 parts by weight of methyl methacrylate, and 50 parts by weight of trimethylolpropane trimethacrylate were used as monomer components and 200 parts by weight of heptane was used as a hollowing agent. The particle average diameter of the obtained resin particles was found to be 25 μm by measurement.

(2) Preparation of Ceramic Composition

A ceramic composition was obtained by mixing 100 parts by weight of a ceramic powder comprising 90% by weight of SiC, 5% by weight of boron oxide, 2% by weight of kaolin, and 3% by weight of alumina with 5 parts by weight of the obtained resin particles.

(3) Production of Porous Ceramic Filter

An extrusion-moldable clay was obtained by adding 10 parts by weight of methyl cellulose, 5 parts by weight of glycerin, and water to the entire amount of the obtained ceramic composition and kneading the mixture. A rectangular parallelepiped honeycomb structure body with rib thickness of 300 μm, 16 cells/cm$^2$, one side length of cross-section of 50 mm, and height of 250 mm was obtained by extrusion-molding method using the obtained clay.

After being dried, the obtained rectangular parallelepiped honeycomb structure body was heated to 400° C. at 10° C./min heating rate and kept at the temperature for 1 hour to degrease the pore-forming material. After that, the rectangular parallelepiped honeycomb structure body was fired by heating at 40° C./h heating rate to the maximum temperature of 2100° C. in an inert gas atmosphere and kept at the temperature for 6 hours to obtain a porous ceramic filter.

When the obtained porous ceramic filter was observed with eyes, there was no occurrence of deformation such as expansion or cracking. The porosity was measured at a sealing mercury pressure of 2000 kg/cm$^2$ using Porosimeter 2000 manufactured by AMCO Co., Ltd. to find it was 44%.

COMPARATIVE EXAMPLE 6

(1) Preparation of Resin Particles

Resin particles were obtained in the same manner as Example 14, except that 5 parts by weight of polyoxyethylene methacrylate (the number of polyoxyethylene unit=about 8; Blemmer PET-350; manufactured by NOF CORPORATION), 85 parts by weight of methyl methacrylate, and 10 parts by weight of trimethylolpropane trimethacrylate were used as monomer components and no hollowing agent was used. The particle average diameter of the obtained resin particles was found to be 45 μm by measurement.

(2) Preparation of Ceramic Composition

A ceramic composition was obtained by mixing 100 parts by weight of a ceramic powder comprising 40% by weight of talc, 20% by weight of kaolin, 18% by weight of alumina, 12% by weight of aluminum hydroxide, and 10% by weight of silica to 70 parts by weight of the obtained resin particles.

(3) Production of Porous Ceramic Filter

An extrusion-moldable clay was obtained by adding 20 parts by weight of methyl cellulose, 10 parts by weight of glycerin, and water to the entire amount of the obtained ceramic composition and kneading the mixture. A cylindrical honeycomb structure body with rib thickness of 300 μm, 16 cells/cm², diameter of 30 mm and height of 100 mm was obtained by extrusion-molding method using the obtained clay.

After being dried, the obtained honeycomb structure body was heated to 400° C. at 10° C./min heating rate and kept at the temperature for 1 hour to degrease the pore-forming material. After that, the cylindrical honeycomb structure body was fired by heating at 40° C./h heating rate to the maximum temperature of 1410° C. and kept at the temperature for 6 hours to obtain a porous ceramic filter.

When the obtained porous ceramic filter was observed with eyes, expansion due to jetting decomposition gas was observed and cracking were occurred. The porosity could not be measured because of such defective structure.

(Evaluation)

The following evaluations were carried out for the resin particles obtained in Examples 14 to 17 and Comparative Example 6.

The results are shown in Table 5.

(1) Measurement of the Hollow Ratio

The hollow ratio was measured using 0.5 g of the obtained resin particles of each sample by Porosimeter 2000 (manufactured by AMCO Co., Ltd.). The measurement temperature was adjusted at 23° C. and the sealing mercury pressure was adjusted at 2000 kg/cm².

(2) Measurement of Heating Loss

The decomposition starting temperature and the 50% by weight loss temperature were measured at a temperature increasing rate of 5° C./min using DSC-6200 (manufactured by Seiko Instruments Inc.). The weight loss ratio after heating at 300° C. for an hour was also measured.

(3) 10% Compressive Strength

The average value of the 10% compressive strength at 23° C. for randomly selected 5 particles of each thermally disappearing resin particle sample was measured using a microhardness meter (manufactured by Fischer instruments Inc.).

quantity of a pore-forming material is used; and a method of producing a porous ceramic filter.

The invention claimed is:

1. A thermally decomposing resin particle,
which is a thermally decomposing hollow resin particle, and the hollow ratio at 23° C. is 5 to 95%, and
which contains a polyoxyalkylene resin, and 10% by weight or more of the resin particle decomposes within an hour by heating at a prescribed temperature in a range from 100 to 300° C., and further contains a crosslinking component and has 10% compressive strength at 23° C. of 1 to 1000 MPa, and is obtained by using a monomer mixture containing a polyoxyalkylene macromonomer and an acrylic polyfunctional monomer,
wherein an average particle diameter is 0.01 to 500 μm.

2. A thermally decomposing resin particle,
which is a thermally decomposing hollow resin particle, and the hollow ratio at 23° C. is 5 to 95%, and
which contains 30% by weight or more of a polyoxyalkylene resin, and 40% by weight or more of the resin particle decomposes within an hour by heating at a prescribed temperature in a range from 140 to 300° C., and further contains a crosslinking component and has 10% compressive strength at 23° C. of 1 to 1000 MPa, and is obtained by using a monomer mixture containing a polyoxyalkylene macromonomer and an acrylic polyfunctional monomer,
wherein an average particle diameter is 0.01 to 500 μm.

3. The thermally decomposing resin particle according to claim 1, wherein the polyoxyalkylene resin is at least one polymer selected from the group consisting of polyoxypropylene, polyoxyethylene, and polyoxytetramethylene.

4. The thermally decomposing resin particle according to claim 3, wherein the content of polyoxypropylene in the polyoxyalkylene resin is 50% by weight or higher.

5. The thermally decomposing resin particle according to claim 1, wherein the number average molecular weight of the polyoxyalkylene resin is 300 to 1000000.

6. The thermally decomposing resin particle according to claim 1, which further contains a decomposition-promoting agent.

TABLE 5

|  | Example 14 | Example 15 | Example 16 | Example 17 | Comparative Example 6 |
|---|---|---|---|---|---|
| average particle diameter(μm) | 52 | 50 | 56 | 25 | 45 |
| hollow ratio(%) | 35 | 41 | 59 | 69 | 0 |
| decomposition starting temperature(° C.) | 170 | 170 | 160 | 170 | 240 |
| 50% by weight loss temperature(° C.) | 210 | 210 | 235 | 210 | 340 |
| weight decrease ratio at 300° C.(% by weight) | 92 | 94 | 80 | 93 | 8 |
| 10% compressive strength(MPa) | 4.3 | 24 | 3.0 | 2.5 | 56 |

INDUSTRIAL APPLICABILITY

According to the present invention, it made possible to provide a thermally disappearing resin particle and a thermally disappearing hollow resin particle which can be decomposed at a low temperature in a short time and do not cause deformation or cracking of a sintered body to be obtained in the case of using as a binder for a ceramic or a lightening material; a method of producing the thermally disappearing hollow resin particle; ceramic composition which can be degreased and fired at a low temperature in a short time and gives a molded body with a high porosity without deformation or cracking even in the case a large 7. The thermally decomposing resin particle according to claim 1, wherein 50% by weight loss temperature is 210° C. or lower.

8. The thermally decomposing resin particle according to claim 7,
wherein 10% by weight or more of the thermally decomposing resin particle decomposes within an hour by heating at a prescribed temperature in a range from 120 to 200° C., and 50% by weight loss temperature being 180° C. or lower.

9. The thermally decomposing resin particle according to claim 7, which further contains a decomposition-promoting agent having a 1 h half-life temperature of 100 to 170° C.

and/or a decomposition-promoting agent having a 1 h half-life temperature of 170 to 250° C.

10. The thermally decomposing resin particle according to claim 7, wherein the decomposition-promoting agent is an azo compound or an organic peroxide.

11. The thermally decomposing resin particle according to claim 7, which contains 0.1 to 10% by weight of the decomposition-promoting agent.

12. The thermally decomposing resin particle according to claim 1, wherein the hollow ratio at 23° C. is 30 to 90%.

13. The thermally decomposing resin particle according to claim 1, which contains 5% by weight or more of a polyoxyalkylene resin.

14. The thermally decomposing resin particle according to claim 13, wherein the polyoxyalkylene resin is at least one kind of polymer selected from the group consisting of polyoxypropylene, polyoxyethylene, and polyoxytetramethylene.

* * * * *